United States Patent
Uematsu et al.

(10) Patent No.: US 11,644,325 B2
(45) Date of Patent: May 9, 2023

(54) NAVIGATION METHOD, NAVIGATION SYSTEM, MOVING BODY, AND NAVIGATION PROGRAM

(71) Applicant: Panasonic Intellectual Property Management Co., Ltd., Osaka (JP)

(72) Inventors: Hiroyuki Uematsu, Osaka (JP); Hiroyuki Sasai, Osaka (JP); Takeshi Ando, Kyoto (JP); Noriaki Imaoka, Tokyo (JP); Duyhinh Nguyen, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/971,013

(22) PCT Filed: Jan. 28, 2019

(86) PCT No.: PCT/JP2019/002614
§ 371 (c)(1),
(2) Date: Aug. 19, 2020

(87) PCT Pub. No.: WO2019/163412
PCT Pub. Date: Aug. 29, 2019

(65) Prior Publication Data
US 2021/0080274 A1    Mar. 18, 2021

(30) Foreign Application Priority Data

Feb. 22, 2018 (JP) .............................. JP2018-030031
Feb. 22, 2018 (JP) .............................. JP2018-030033

(51) Int. Cl.
*G01C 21/34*    (2006.01)
*G01C 21/36*    (2006.01)

(52) U.S. Cl.
CPC ..... *G01C 21/3461* (2013.01); *G01C 21/3605* (2013.01)

(58) Field of Classification Search
None
See application file for complete search history.

(56) References Cited

U.S. PATENT DOCUMENTS

| 8,700,250 B1 | 4/2014 | Curtis et al. | |
| 2004/0162755 A1* | 8/2004 | Muller | B64F 1/00 |
| | | | 705/13 |
| 2017/0169528 A1* | 6/2017 | Kundu | H04L 65/765 |

FOREIGN PATENT DOCUMENTS

| JP | 2006-226977 | 8/2006 |
| JP | 4521036 B | 8/2010 |

(Continued)

OTHER PUBLICATIONS

Extended European Search Report dated Mar. 16, 2021 for the related European Patent Application No. 19757131.8.

(Continued)

*Primary Examiner* — Yuen Wong
*Assistant Examiner* — Hongye Liang
(74) *Attorney, Agent, or Firm* — McDermott Will & Emery LLP

(57) ABSTRACT

Based on schedule information indicating one or more events to be occurred and information relating to a location associated with each of the one or more events, a navigation method estimates an area and time at which congestion may be likely to occur in the vicinity of the location. Furthermore, the navigation method presents to a moving body information which is based on the estimated result of the area and the time, and which is related to a movement plan when moving using the moving body.

20 Claims, 20 Drawing Sheets

(56) References Cited

FOREIGN PATENT DOCUMENTS

| | | |
|---|---|---|
| JP | 2012-103141 | 5/2012 |
| JP | 2016-173270 | 9/2016 |
| JP | 2017-194859 | 10/2017 |

OTHER PUBLICATIONS

International Search Report of PCT application No. PCT/JP2019/002614 dated Apr. 2, 2019.

* cited by examiner

FIG. 6

1161: FLIGHT INFORMATION

| FLIGHT NUMBER | DESTINATION | SCHEDULED TIME | CHANGE | CHECK IN | BOARDING GATE | STATUS |
|---|---|---|---|---|---|---|
| AAA | NEW YORK | 14:15 | — | A | 101 | FINAL BOARDING INFORMATION |
| BBB | SAN FRANCISCO | 14:20 | — | G | 108 | CHECKING IN |
| CCC | SYDNEY | 14:30 | 14:45 | D | 113 | CHECKING IN |
| DDD | SEOUL | 15:00 | CANCELLATION | — | — | — |
| ... | ... | ... | ... | ... | ... | ... |

FIG. 7

1162: FLIGHT RESERVATION INFORMATION

| FLIGHT NUMBER | NUMBER OF PEOPLE RESERVED | NUMBER OF CHECK IN PEOPLE |
|---|---|---|
| AAA | 250 | 245 |
| BBB | 200 | 190 |
| CCC | 160 | 120 |
| ... | ... | ... |

FIG. 8

1163: MOBILITY ATTRIBUTE INFORMATION

| MOBILITY ID | MODEL | MOVEMENT SPEED | SIZE (L × W × H) | (MOVEMENT HISTORY) |
|---|---|---|---|---|
| M#1 | XXX | 0-6 km/h | 90cm×60cm×80cm | ... |
| M#2 | XXX | 0-6 km/h | 90cm×60cm×90cm | ... |
| M#3 | YYY | 0-4.5 km/h | 98cm×50cm×75cm | ... |
| ... | ... | ... | ... | ... |

FIG. 9

1166: AREA/FACILITY RELATED INFORMATION

| AREA ID | PASSAGE ID | PASSAGE WIDTH | FACILITY | ADVERTISEMENT | PRIVILEGE | BILLING DESTINATION |
|---|---|---|---|---|---|---|
| A#1 | aa#11 | Wa#1 | LOUNGE A | Ad#1 | — | Ca#1 |
| A#1 | aa#12 | Wa#2 | CAFÉ B | Ad#2 | COUPON | Ca#2 |
| A#1 | aa#12 | Wa#2 | SOUVENIR SHOP C | Ad#3 | COUPON | Ca#3 |
| B#1 | bb#11 | Wb#1 | TOILET D | — | — | — |
| B#1 | bb#12 | Wb#2 | GUIDE COUNTER E | — | — | — |
| B#2 | bb#22 | Wb#3 | SMOKING ROOM F | — | — | — |
| ⋮ | ⋮ | ⋮ | ⋮ | ⋮ | ⋮ | ⋮ |

SERVER OPERATION EXAMPLE

MOBILITY OPERATION EXAMPLE

MOBILITY OPERATION EXAMPLE

SERVER OPERATION EXAMPLE

MOBILITY OPERATION EXAMPLE

SERVER OPERATION EXAMPLE

NAVIGATION METHOD, NAVIGATION SYSTEM, MOVING BODY, AND NAVIGATION PROGRAM

CROSS-REFERENCE TO RELATED APPLICATIONS

This application is a U.S. national stage application of the PCT International Application No. PCT/JP2019/002614 filed on Jan. 28, 2019, which claims the benefit of foreign priority of Japanese patent application No. 2018-030031 and No. 2018-030033 filed on Feb. 22, 2018, the contents all of which are incorporated herein by reference.

TECHNICAL FIELD

The present disclosure relates to a navigation method, a navigation system, a moving body, and a navigation program.

BACKGROUND ART

There is a car navigation technology that searches for and guides a route when a moving body such as an automobile moves to a destination. For example, in some car navigation technology, a route to a destination that avoids a specific point or route where an accident is likely to occur is searched with road network data. Further, when the avoided route is not searched, a route that is restricted to pass through the specific point or route, is searched in the road network data.

CITATION LIST

Patent Literature

PTL 1: Japanese Patent No. 4521036

SUMMARY OF THE INVENTION

A navigation method according to an aspect of the present disclosure estimates, based on schedule information indicating one or more events to be occurred and information relating to a location which is associated with each of the one or more events, an area and time at which congestion may be likely to occur in the vicinity of the location.

Furthermore, the navigation method presents, to a moving body, information which is based on a result of the estimating of the area and the time, and which is related to a movement plan when moving using the moving body.

A navigation system according to another aspect of the present disclosure includes a moving body and a server that communicates with the moving body.

The server includes an estimation unit that estimates, based on schedule information indicating one or more events to be occurred and information related to a location associated with each of the one or more events, an area and time at which congestion is likely to occur around a location, and a transmitter that transmits an estimated result of the estimation unit to the moving body.

The moving body includes a receiver that receives the estimated result, and a display unit that displays information which is based on the estimated result, and which is related to a movement plan when moving using the moving body based on the schedule information.

A moving body according to still another aspect of the present disclosure includes a receiver and a display unit.

The receiver receives a result of estimation of, based on schedule information indicating one or more events to be occurred and information related to a location associated with each of the one or more events, an area and time at which congestion is likely to occur around the location.

The display unit displays information which is based on the estimated result of the area and the time, and which is related to a movement plan when moving using the moving body based on the schedule information.

A navigation program according to still another aspect of the present disclosure causes a processor to execute a process of receiving a result of estimation of, based on schedule information indicating one or more events to be occurred and information related to a location associated with each of the one or more events, an area and time at which congestion is likely to occur around the location.

Furthermore, the navigation program causes the processor to execute a process of displaying information which is based on an estimated result of the area and the time, and which is related to a movement plan when moving using the moving body based on the schedule information on a display unit.

BRIEF DESCRIPTION OF DRAWINGS

FIG. 6 is a diagram illustrating an example of flight information stored and managed in the management server according to the exemplary embodiment.

FIG. 7 is a diagram illustrating an example of flight reservation information stored and managed in the management server according to the exemplary embodiment.

FIG. 8 is a diagram illustrating an example of mobility attribute information stored and managed in the management server according to the exemplary embodiment.

FIG. 9 is a diagram illustrating an example of area/facility related information stored and managed in the management server according to the exemplary embodiment.

DESCRIPTION OF EMBODIMENT

Figure 1:
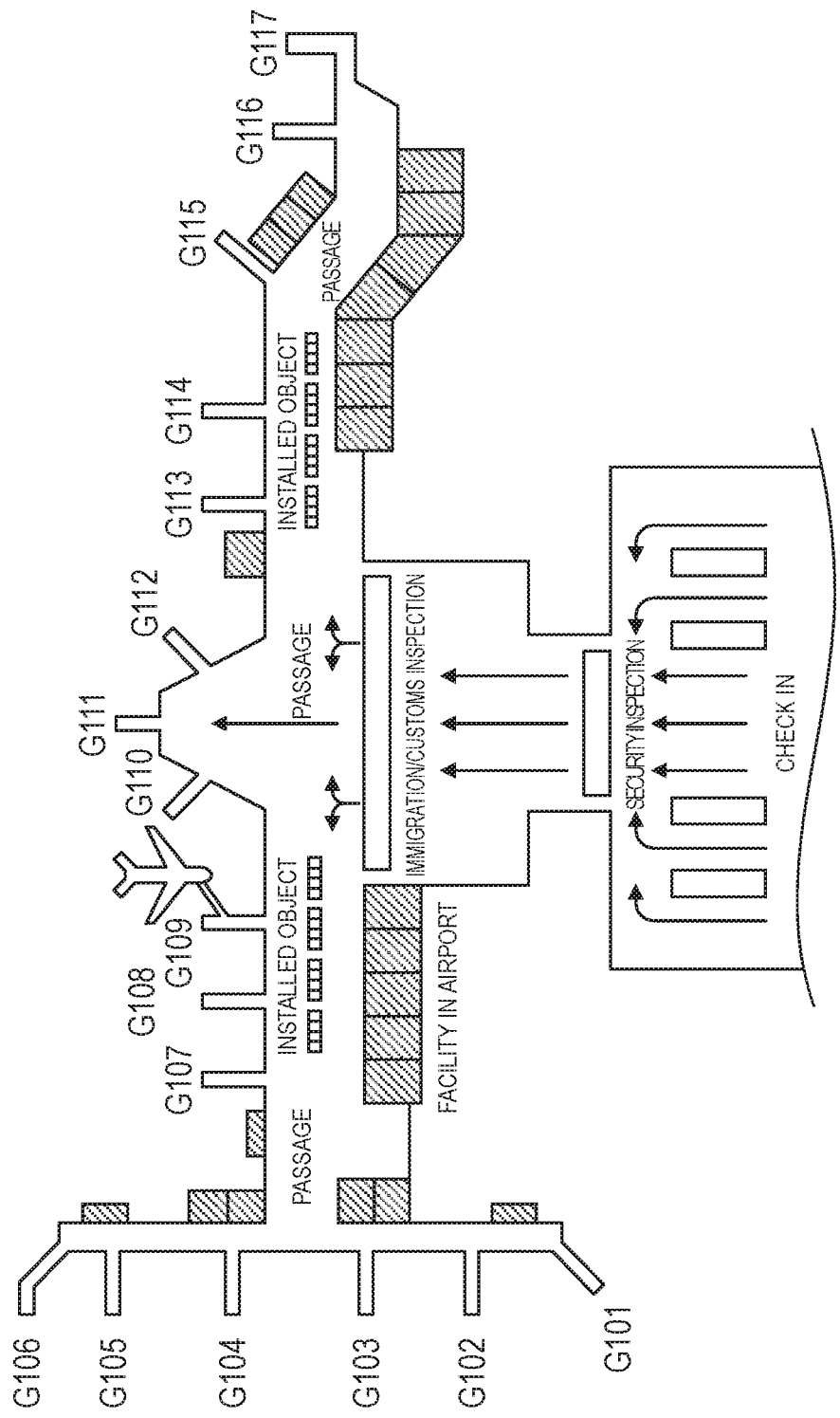
FIG. 1 is a plan view schematically illustrating an example of a floor map in a passenger terminal which is an example of an airport facility according to an exemplary embodiment.

The car navigation technology in the related art merely searches for a route for moving an automobile to a destination using road network data. It can be said that the road network has a large number of selections of routes to reach the destination. In other words, it has a high degree of freedom in a route selection. Therefore, in the car navigation technology, how to search for a route that can avoid a specific point or route is important.

The non-limiting example of the present disclosure contributes to the provision of a technology capable of realizing a smooth movement using a moving body by a movement plan that takes into account areas and time when congestion may occur due to scheduled events that occur in the future.

Hereinafter, an exemplary embodiment of the present disclosure will be described in detail with reference to the drawings as appropriate. However, more detailed description than necessary may be omitted. For example, detailed description of well-known matters or duplicate description of substantially the same configuration may be omitted. This is to prevent the following description from being unnecessarily redundant and to facilitate understanding by those skilled in the art.

The accompanying drawings and the following description are provided for those skilled in the art to fully understand the present disclosure, and are not intended to limit the claimed subject matter by the accompanying drawings and the following description.

<Overview>

In the present exemplary embodiment, a system that provides a navigation service to a user of facilities such as airports (hereinafter it may be referred to as a "navigation system") will be described.

For example, a navigation system according to an exemplary embodiment provides a user with a navigation service that contributes to smooth movement using a mobility in a case where an airport user uses a moving body (for example, a mobility) to move a passenger terminal. The "passenger terminal" may be either an "international terminal" or a "domestic terminal".

The "navigation" service may be considered as an example of a service that presents information related to a plan of a future movement using a mobility to the mobility. Such a navigation service may be referred to as a "mobility navi".

One non-limiting example of "mobility" is an electric wheelchair. A non-limiting example of a user using an electric wheelchair is a physically handicapped person or an elderly person. The airport users such as physically handicapped persons and elderly persons, who have lower moving capacity than healthy persons, may be referred to as a "passengers with reduced mobility (PRM)".

For example, the navigation system provides a service that guides or leads an electric wheelchair used by the PRM to move within a passenger terminal to a destination designated by the PRM. Non-limiting examples of a destination within the passenger terminal include a boarding gate, a lounge, a restaurant, a cafe, a toilet, or a store such as a souvenir shop.

"Mobility" is not limited to an electric wheelchair. For example, a small electric vehicle (for example, an electric standing motorcycle, an electric cart, an electric trolley, or an electric baby cart) may correspond to the mobility. In other words, any moving body that is expected to be used at an airport facility may correspond to the "mobility". Further, a user who moves by using "mobility" (hereinafter, it may be abbreviated as a "mobility user") is not limited to PRM. The healthy person may be a mobility user.

The mobility has, for example, an automatic operation mode of recognizing the mobility's position and autonomously moving within a certain area. In the state where the automatic operation mode is not valid, the mobility may be controlled to move (in other words, "operation") in a manual operation mode in accordance with a manual operation of a user.

For example, when the mobility is autonomously moving in the automatic operation mode and the manual operation input by the user is observed, the mobility may cancel the automatic operation mode and perform the movement control based on the manual operation.

The movement of the mobility may be controlled, for example, through an operation unit mounted in the mobility, or may be controlled through an information terminal such as a mobile phone (including a smartphone) possessed by the mobility user. The movement of the mobility may be remotely controlled from a server computer (hereinafter it is abbreviated as a "server").

The information terminal may be referred to as a user equipment (UE). The UE is not limited to a mobile phone, and may be a tablet terminal, a laptop computer, a personal digital assistance (PDA), a digital music player, an electronic book terminal, or the like.

A sensor that performs sensing an obstacle or the like in the vicinity is mounted on the mobility, for example. For example, the mobility can automatically avoid a collision or can automatically stop the movement by controlling the movement based on the sensing result of the sensor. The obstacle may include one or both of an object and a living body such as a person. "Sensing" may be replaced with another term such as "detecting", "observing", or "measuring".

A mobility may be owned by an airport and rented to a user according to a predetermined lending procedure, or may be a mobility owned by a user individually. The airport-owned mobility may have a function or a mode of autonomously moving to a predetermined collection (or standby) position according to the end of use by the user. Such a function or a mode may be referred to as an "automatic collection function" or an "automatic collection mode". The "automatic collection function" can reduce the work burden on the airport staff, for example.

The input of information such as a destination with respect to the mobility may be a manual input by a mobility user or an input by reading the information. For example, the information read by the UE may be input to mobility by communication.

For example, by reading a two-dimensional code such as a barcode described in a boarding ticket or a quick response (QR) code (registered trademark) with the UE, the information of the boarding gate can be input to the mobility as a destination. For example, the information of the boarding gate may be read by the UE from the digital signage that is installed in the passenger terminal and that displays the flight information, and may be input to the mobility.

Information on the destination such as a boarding gate, lounge, restaurant, cafe, or store may be read from the digital signage that is installed in the passenger terminal and displays map information such as floor maps and/or facility information using the UE, and may be input to the mobility.

Further, for example, by linking the passport information of the mobility user with the information managed by the airport-side system (for example, the server) (for example, information on the flight scheduled for the mobility user, or the like), it is possible to specify the information on the flight scheduled for the mobility user and the boarding gate.

Therefore, for example, based on the passport information presented by the mobility user in the immigration control, the information on the boarding gate of the mobility user may be input to the mobility as the information on the destination by the communication between the airport-side system and the mobility.

For example, when a mobility user made a reservation of the flight using an application provided by the airport-side system, the boarding gate information specified based on the reservation information may be input to the mobility from the airport-side system as the information on the destination.

The "flight information" is, for example, information in which the time of flight (departure time and/or arrival time) is scheduled, and may be referred to as a "flight schedule". The flight information related to the departure may include information such as a flight number, a destination, departure time, a boarding gate, and the like.

<Example of Airport Facilities>

FIG. 1 is a plan view schematically illustrating an example of a floor map in a passenger terminal which is an example of an airport facility according to an exemplary embodiment. As a non-limiting example, FIG. 1 illustrates a map of a departure gate floor at an international terminal.

In FIG. 1, each of G101 to G117 represents a boarding gate (it may be referred to as a "departure gate"). The passenger, for example, checks in the boarding procedure (check in) area and then takes a security inspection in a security inspection (security check) area.

Passengers who have passed the security inspection proceed to, for example, immigration (for example, passport check) and customs inspection areas, and take an immigration and a customs inspection. Passengers who have passed the immigration and the customs inspection move along the passage to any of the boarding gates G101 to 117 on which the flight to be boarded waits.

The mobility may be started by the passengers who have passed the immigration and customs inspections, for example. When the passenger is allowed to take the security inspection while using the mobility, for example, the use of the mobility may be started from an area before the security inspection area (for example, the security gate).

In FIG. 1, in one or both of the both sides of the passage in a width direction leading to any of the gates G101 to 117, as indicated by hatching, for example, facilities such as a lounge, restaurant, cafe, toilet, or store are appropriately located. In the passage, for example, a chair for a break or other equipment (hereinafter it may be referred to as an "installed object") may be disposed. The width of the passage may vary depending on the disposition of the equipment in the passage.

For example, as the current time approaches the departure time of the flight departing from the boarding gate G109, when a large number of passengers scheduled to board the flight gather in the area around the boarding gate G109, the degree of congestion in the area around the boarding gate G109 increases. In FIG. 1, since there is an installed object in the passage in the area around the boarding gate G109, the width of the passage is narrowed. Therefore, for example, when the mobility of the PRM moving to the boarding gate G106 is involved in congestion in the area around the boarding gate G109 (hereinafter, it may be referred to as a "congested area"), there is a possibility that it takes more time to get through the congestion as compared with the passengers walking on foot.

For example, depending on the size (for example, the width) of the mobility, it may take a lot of time for the mobility to pass through the congested area, or the mobility may not pass through the congested area until the congestion is resolved. Therefore, there is a possibility that the mobility user may not be in time for the departure time of the flight scheduled to be boarded from the boarding gate G106.

Therefore, in the present exemplary embodiment, for example, the future congestion and time period that may occur around the boarding gate of the airport are estimated based on the flight information and the information related to the location (for example, the boarding gate) associated with the flight. Further, the navigation service using the estimated result is provided to the mobility user.

"Estimation" may be replaced and read as "prediction" or "guessing." The "passenger terminal" is an example of an area in an airport facility where a pedestrian can move on foot and a mobility user can move using a mobility.

The "flight information" is an example of schedule information in which an event (for example, a flight) that may occur in the future at an airport facility is scheduled. The "boarding gate" is an example of a facility in the airport, and is an example of a "location" associated with a scheduled event (flight). The "location" associated with the event is an example of a location affected by the event related to the degree of congestion, and may be referred to as an "event affection area" or a "flight affection area" for convenience.

The navigation service may include, for example, presenting to the mobility user an estimated result of the future congestion and time period that may occur around the boarding gate, and/or information based on the estimated result.

Further, the navigation service may include searching for a route that allow the mobility user to reach the boarding gate from the mobility user's current position while avoiding congestion and/or calculation of information related to time (time or period) associated with the movement of the route, based on the estimated result. Further, the navigation service may include, for example, presenting to the mobility user the searched route and/or the information related to the calculated time.

"Presenting" the information to the mobility user may be, for example, displaying the information on a display unit (display) visually recognized by the mobility user. The display may be a display of the mobility or a display of the UE possessed by the mobility user. When the mobility is equipped with a printer, printing the information by the printer may correspond to "presenting" the information.

Further, the navigation service may also include presenting to the mobility user the information related to the facilities in the airport (for example, lounges, restaurants, cafes, toilets, retail stores, or the like) located around the searched route.

The information related to the facilities in the airport may include or may be associated with, for example, the advertisement information of the facilities in the airport, and/or privilege information of the facilities in the airport for the user. The privilege information is, for example, information related to a privilege such as a coupon ticket or a discount ticket given to a user of the facilities in the airport. The advertisement information and the privilege information may be collectively referred to as, for example, "information for inviting visitors to the facility".

<Example of System Configuration>

Hereinafter, an example of a navigation system that provides the above-described navigation service (mobility navi) will be described. In the following description, the passenger terminal is an example of an airport facility, and a boarding gate, a lounge, a restaurant, a cafe, a toilet, or a store such as a souvenir shop located in the passenger terminal is an example of a facility in the airport.

Figure 2:
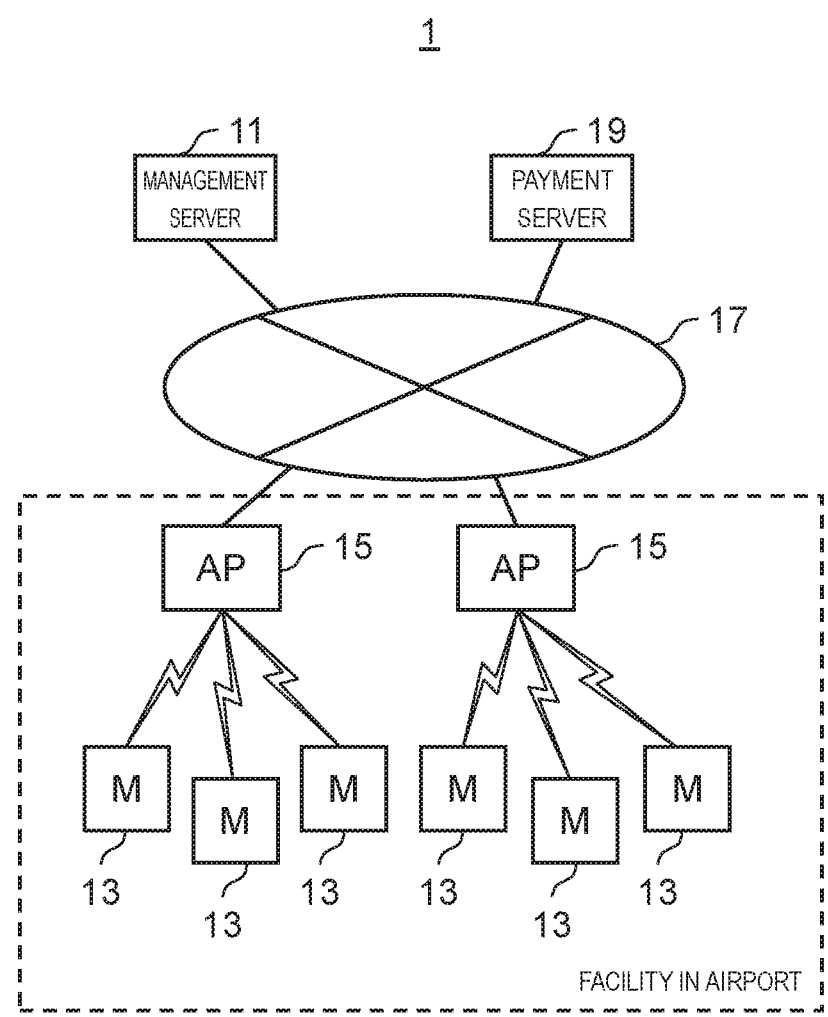
FIG. 2 is a diagram illustrating a configuration example of a navigation system according to the exemplary embodiment.

FIG. 2 is a diagram illustrating a configuration example of a navigation system according to the exemplary embodiment. Navigation system 1 illustrated in FIG. 2 includes, for example, management server 11 and one or more mobilities (M) 13. Each of mobilities 13, for example, has a wireless communication function, and can communicate with management server 11.

The communication between each of mobilities 13 and management server 11 may be performed via access point (AP) 15, for example. Further, the communication between each of mobilities 13 and management server 11 may be performed via network (NW) 17 including the Internet and/or a local area network (LAN) or the like, for example.

In FIG. 2, an example is illustrated in which management server 11 and one or more APs 15 are connected to network 17 by, for example, a wired cable. For the wired cable, a LAN cable may be used or an optical fiber cable may be used.

Each of mobilities 13 communicates with management server 11 via network 17 by wirelessly connecting to any AP 15, for example. AP 15 may be, for example, an AP that performs communication in conformity with a wireless LAN related standard such as IEEE 802.11, or may be a base station that performs communication in conformity with LTE, LTE-advanced, or mobile communication standards after the next-generation (for example, 5G).

When mobility 13 is positioned within the wireless service area in which AP 15 is formed, mobility 13 can wirelessly connect to AP 15 and perform the wireless communication.

The communication between each of mobilities 13 and management server 11 may be bi-directional communication. Mobility 13 and AP 15 are provided in the passenger terminal, for example. Management server 11 may be provided, for example, inside the passenger terminal or may be provided outside the passenger terminal. Management server 11 is an example of an element of the above-mentioned airport-side system.

As illustrated in FIG. 2, navigation system 1 may include payment server 19. Payment server 19 performs billing (or payment) processing when, for example, the advertisement information and/or the privilege information related to the facilities in the airport such as restaurants, cafes, or souvenir shops is presented to the mobility user in the navigation service of mobility 13.

In FIG. 2, management server 11 and payment server 19 are illustrated individually, but the functions of both may be integrated into one server. Further, a plurality of one or both of management server 11 and payment server 19 may be provided in navigation system 1. Management processing may be distributed and performed by the plurality of management servers 11. Similarly, the payment processing may be distributed and performed by the plurality of payment servers 19. Further, one or both of the management processing and the payment processing may be realized by the distributed processing by a plurality of servers without distinguishing between management server 11 and payment server 19.

Hereinafter, configuration examples of mobility 13 and management server 11 will be described item by item.

<Configuration Example of Mobility>

Figure 3:
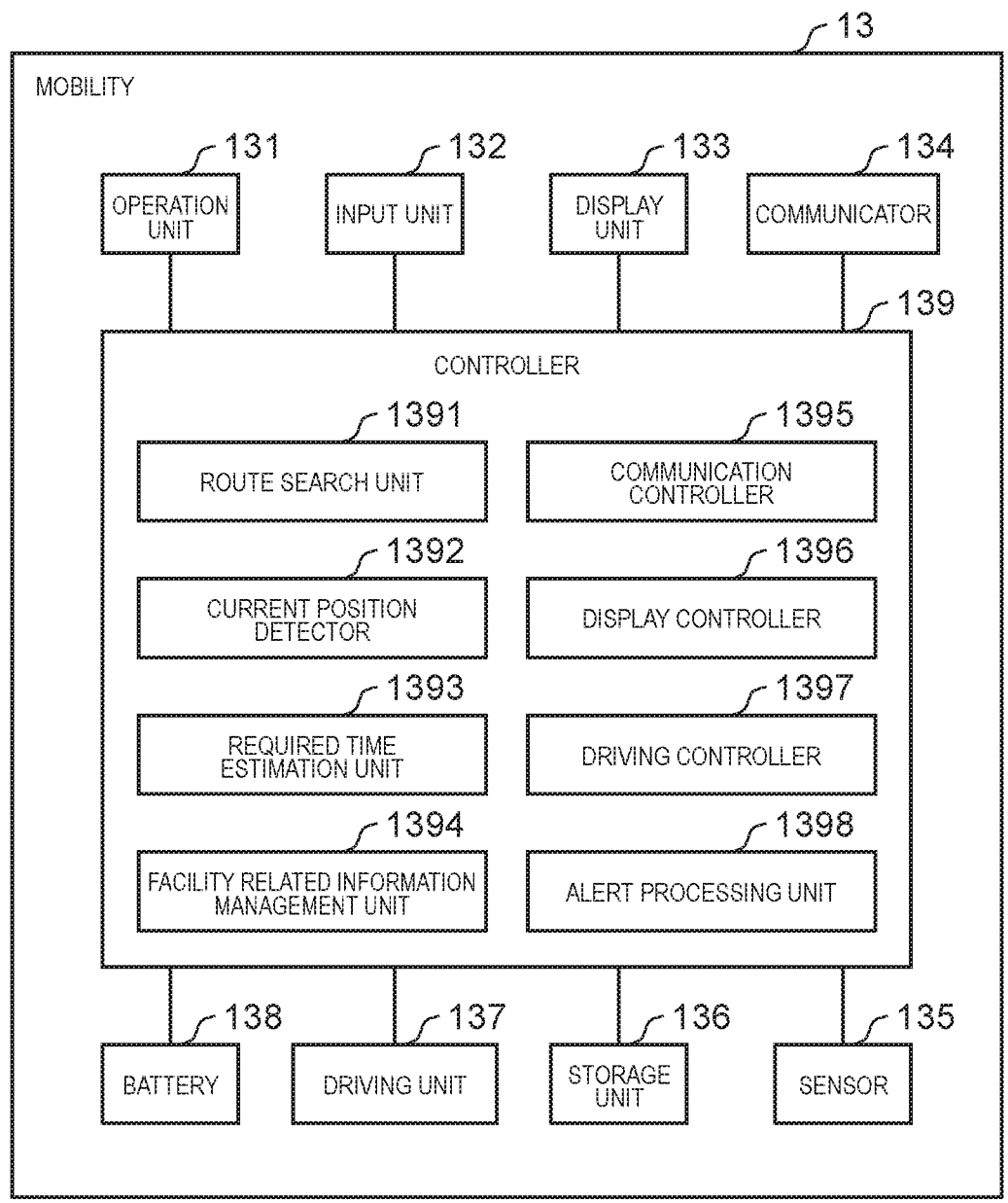
FIG. 3 is a block diagram illustrating an example of a functional configuration of a mobility according to the exemplary embodiment.
Figure 4:
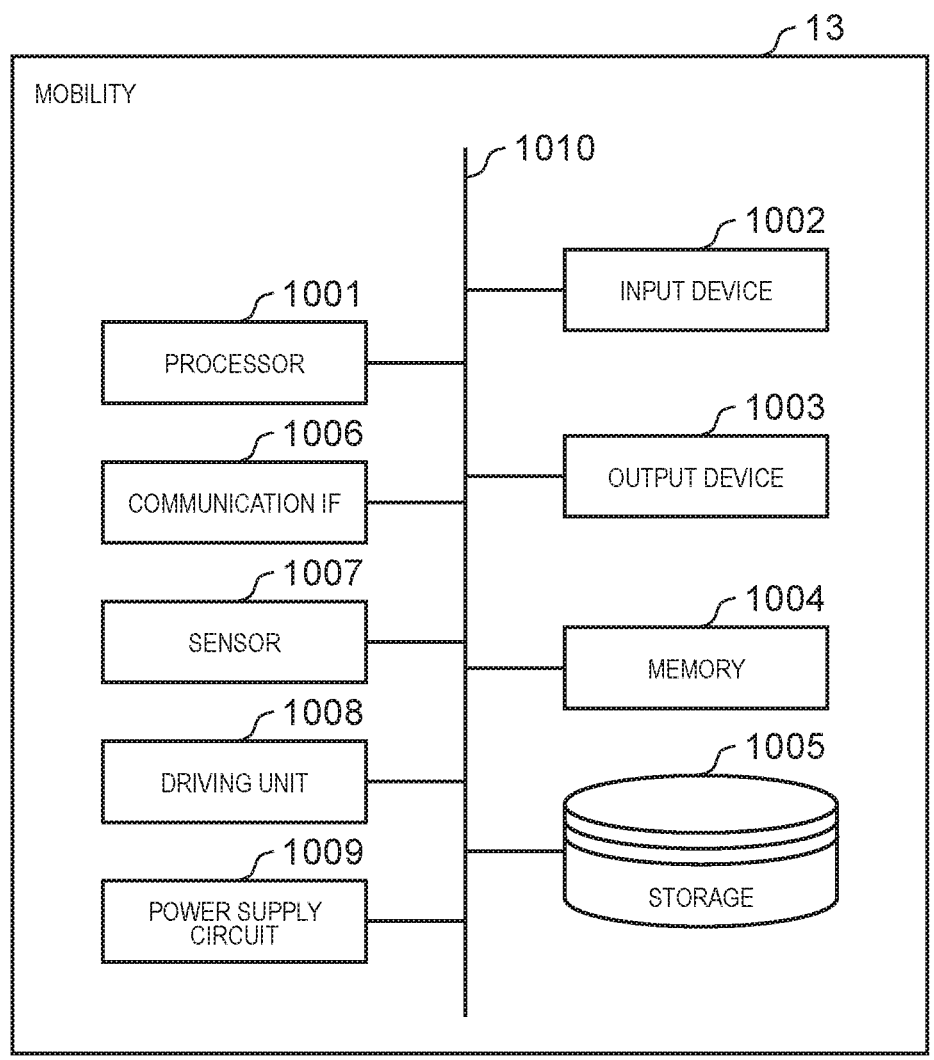
FIG. 4 is a block diagram illustrating an example of a hardware configuration of the mobility according to the exemplary embodiment.

FIG. 3 is a block diagram illustrating an example of a functional configuration of mobility 13 according to one exemplary embodiment, and FIG. 4 is a block diagram illustrating an example of a hardware configuration of mobility 13 according to one exemplary embodiment.

(Functional Configuration Example of Mobility)

As illustrated in FIG. 3, mobility 13 may include operation unit 131, input unit 132, display unit (display) 133, communicator 134, sensor 135, storage unit 136, driving unit 137, battery 138, and controller 139, for example.

Operation unit 131 is operated by, for example, a mobility user, and inputs a signal in response to the operation (hereinafter, it may be abbreviated as an "operation signal") to controller 139. For example, an operation signal in response to a user operation for giving an instruction to the mobility to perform at least one of forward movement, backward movement, direction change, and increase/decrease in movement speed may be input to controller 139. The driving control signal in accordance with the operation signal is given to driving unit 137 from controller 139, for example, so that the behavior of mobility 13 (in other words, an operation state) is controlled in response to a user operation.

Input unit 132 receives an input of information, for example. For example, the information designating the destination in the passenger terminal is received by input unit 132 and is input to controller 139.

Display unit 133 displays the information, for example. The information displayed on display unit 133 may be, for example, the information stored in storage unit 136 or the information generated by controller 139. For example, information related to the mobility navi may be displayed on display unit 133.

For example, an input screen that prompts the mobility user to input information such as a destination may be generated by controller 139 and displayed on display unit 133. Further, for example, in association with the mobility navi, the map information of the passenger terminal, the facility information installed in the passenger terminal, and/or the advertisement information related to the facility information may be displayed on display unit 133.

Further, for example, the information indicating an area around the boarding gate where the congestion is expected due to a flight (hereinafter, it may be referred to as a "congestion expected area") and the time period thereof may be displayed on display unit 133. Further, for example, the information (movement start information) indicating a movement route, which avoids the congestion expected area and the time period thereof, and a movement start time (departure time) from the current position may be displayed on display unit 133.

The time period in which the congestion is expected is, for example, the time period from the time before the flight departure time to the flight departure time. However, the time after the flight departure time may be included in the time period in which the congestion is expected. For example, a time period after the departure time of the flight and until the time when the congestion is gradually alleviated and resolved may be included in the time period in which the congestion is expected as a margin.

Input unit 132 and display unit 133 may be configured with individual devices, or may be integrated into a device that can input and output (display) information in parallel, such as a touch panel display.

Communicator 134 communicates with management server 11 via AP 15 and network 17, for example. Therefore, communicator 134 may include, for example, a transmitter and a receiver (not illustrated) for information. The communication with management server 11 by communicator 134 may be controlled by controller 139, for example.

For example, communicator 134 transmits/receives information related to the mobility navi to/from management server 11. Further, by communicating with the UE, for example, communicator 134 may receive information read by the UE as described above and input the information to controller 139. The information read by the UE may include the information read from the digital signage, as described above. Mobility 13 may be provided with a UE holder (not illustrated) for attaching the UE to mobility 13.

Further, communicator 134 may include, for example, an LED light receiver (not illustrated) that receives light emitting diode (LED) light of the digital signage. By providing the LED light receiver, for example, communicator 134 can read the information indicated by the blinking of the LED light from the digital signage without going through the UE.

Communicator 134 may include, for example, a circuit that transmits (for example, broadcast) a wireless signal (for example, a transmission signal such as a beacon signal) used for a position estimation (or a position detection) of mobility 13 to the surroundings, and/or a circuit that receives such a wireless signal. For example, the position of mobility 13 can be estimated based on the position information of one or a plurality of APs 15 that received the wireless signal transmitted by mobility 13.

Therefore, for example, by AP 15 that received the wireless signal, notifying management server 11 of the reception of the wireless signal via the network 17, management server 11 can estimate the position of mobility 13.

Further, for example, as mobility 13 receives the wireless signal from one or a plurality of wireless equipment (AP 15 may be used or wireless equipment different from AP 15 may be used), which are installed in the airport facility, it is also possible to estimate (or detect) the position of mobility 13 in mobility 13. Mobility 13 and/or management server 11 may estimate (or detect) the position of mobility 13 by using the radio waves (wireless signals) of a global positioning system (GPS).

Sensor 135 performs sensing of the periphery of mobility 13, for example. By the sensing, for example, an obstacle or the like existing around mobility 13 can be observed. Based on the sensing result (hereinafter it may be referred to as "sensor information"), for example, by controller 139 controlling driving unit 137, the automatic collision avoidance function (or mode) and/or the automatic stop function (or mode) of mobility 13 is realized.

Storage unit 136 stores information related to the mobility navi. For example, the map information on the airport facility (for example, a passenger terminal), the flight information, the information indicating a flight reservation status, the attribute information of mobility 13, and/or the information related to the facilities in the airport may be stored in storage unit 136. The attribute information of mobility 13 may be abbreviated as "mobility attribute information". Further, the information indicating the flight reservation status may be abbreviated as "flight reservation information".

The information related to the facilities in the airport may be information for guiding, introducing, or advertising the facilities in the airport. As will be described later with reference to FIG. 10, the information related to the facilities in the airport may include or may be associated with information related to the passage, the width of the passage, and/or the facilities in the airport, which are included in each of the areas when the airport facilities are divided into several areas. Hereinafter, the information related to the facilities in the airport may be written as "facility related information" or "area/facility related information".

The flight information, the flight reservation information, and the mobility attribute information will be described later with reference to FIGS. 6 to 8 together with the description related to the configuration example of management server 11.

Driving unit 137 has a driving mechanism of mobility 13 including, for example, a motor and wheels. The driving control signal in accordance with an operation signal input through operation unit 131 is given from controller 139 to driving unit 137, so that the operation state of mobility 13 is controlled.

For example, by controlling the rotation direction of the motor, the number of rotations, and/or the direction of the wheels according to the driving control signal, the forward movement, the backward movement, the direction change, and/or the increase/decrease in movement speed of mobility 13 are performed. Driving unit 137 may have a mechanism for levitating and moving mobility 13.

Battery 138 supplies the electric power for operating each of operation unit 131 to driving unit 137 and controller 139, which are the constituent elements (elements) illustrated in FIG. 3, for example. As a non-limiting example of battery 138, a rechargeable battery it is also referred to as a secondary battery) such as a lithium ion battery may be applied.

Controller 139 controls, for example, the operation of each of the above-described elements (operation unit 131 to controller 138) to control the overall operation of mobility 13. When focusing on the mobility navi, controller 139 may include route search unit 1391, current position detector 1392, and required time estimation unit 1393, for example.

Further, controller 139 may include, for example, facility related information management unit 1394, communication controller 1395, display controller 1396, driving controller 1397, and alert processing unit 1398. Facility related information management unit 1394 and/or alert processing unit 1398 may be optional.

Route search unit 1391 searches, for example, one or more routes from the current position of mobility 13 to the destination using the map information on the passenger terminal. The route searched by route search unit 1391 may be abbreviated as a "searched route".

The current position of mobility 13 is detected by current position detector 1392, for example. The destination may be input (or designated) through input unit 132, for example. The map information of the passenger terminal is stored in, for example, storage unit 136.

Current position detector 1392 detects the current position of mobility 13 by, for example, communication using communicator 134. For example, based on the reception intensity of the radio wave received from one or more APs 15 and/or wireless equipment in communicator 134, the current position of mobility 13 may be detected (it may be referred to as "estimation").

Alternatively, the current position of mobility 13 may be detected using the GPS radio waves received by communicator 134. Further, by mutually complementary use of a wireless signal (for example, a beacon signal) received from AP 15 or other wireless equipment and a GPS radio wave, the current position of mobility 13 may be detected.

The current position of mobility 13 may be estimated or detected by management server 11, for example, based on a wireless signal for position estimation, such as a beacon signal, transmitted from communicator 134 of mobility 13.

The required time estimation unit 1393 calculates and estimates, for example, the time taken when mobility 13 moves from the current position to the destination on the route searched by route search unit 1391 based on the attribute information of mobility 13 (for example, movement speed and size).

The estimation of the required time may be performed based on the information indicating the congestion expected area and the time period thereof, for example. The congestion expected area and the time period thereof may be estimated by management server 11 and acquired from management server 11 by the communication via communicator 134, for example.

Required time estimation unit 1393 calculates, for example, a departure time from the current position at which mobility 13 can move while avoiding the congestion expected area and the time period thereof.

Facility related information management unit 1394 manages, in the storage unit 136, the information related to the facilities in the airport such as boarding gates, lounges, restaurants, cafes, toilets, and stores (hereinafter, it may be referred to as "facility related information" for convenience). The facility related information may include or may be associated with, for example, the advertisement information and/or the privilege information of the facilities in the airport.

Communication controller 1395 controls the communication between mobility 13 and the external equipment (for example, AP 15 and/or management server 11) via communicator 134, for example.

Display controller 1396 controls the display state of display unit 133, for example, by giving display unit 133 a display control signal based on the information to be displayed on display unit 133.

In the manual mode, driving controller 1397, for example, generates a driving control signal in accordance with the operation signal input through operation unit 131 and supplies the drive control signal to driving unit 137. Thereby, the driving state of driving unit 137 is controlled, and the operation state of mobility 13 is controlled.

In the automatic operation mode, driving controller 1397 cooperates with, for example, route search unit 1391, current position detector 1392, and sensor 135 to generate a driving control signal for autonomously moving the searched route by route search unit 1391, and transmits the driving control signal to driving unit 137.

For example, based on the information on the current position detected by current position detector 1392, the information on the designated destination, and the map information on storage unit 136, driving controller 1397 generates a driving control signal for autonomously moving the searched route from the current position to the destination.

The driving control signal may be generated or corrected based on the sensor information from sensor 135, for example. For example, "shifting" from the route of mobility 13 during the movement may be corrected based on the sensor information.

For example, the movement direction of mobility 13 may be corrected based on the information indicating the distance to the wall in the passage measured by sensor 135, the three-dimensional information indicating the surrounding environment other than the wall, and/or the dead reckoning which uses the information indicating the amount of rotation of the wheels of mobility 13.

The dead reckoning is also called a relative self position estimation method. When mobility 13 is provided with a plurality of wheels, the movement direction of mobility can be changed by independently controlling the amount of rotation of the wheels. Therefore, the movement direction of mobility 13 can be estimated based on the amount of rotation of each of the wheels. The three-dimensional information indicating the surrounding environment of mobility 13 may be acquired by, for example, a camera (not illustrated) mounted on mobility 13.

Further, when the sensor information indicates the observation of an obstacle, a driving control signal that reduces the movement speed of mobility 13 or a driving control signal that stops the movement of mobility 13 may be generated.

A plurality of operation modes may be set as selectable in the automatic operation mode. For example, the operation mode when each of a plurality of persons such as a family moves by using mobility 13 as a group and the operation mode when moving by using mobility 13 alone, may be set to the automatic operation mode. For example, the settings of the movement speed of mobility 13 may be different for each operation mode.

The settings or selection of the operation mode may be performed through operation unit 131, for example. Information on the set or selected operation mode (hereinafter it may be referred to as "operation mode set information") is stored in storage unit 136 through controller 139, for example. Driving controller 1397 generates a driving control signal in accordance with the operation mode by referring to the operation mode set information in storage unit 136.

For example, according to the estimation or calculation result of required time estimation unit 1393, alert processing unit 1398 generates alert information when it is determined that the arrival of mobility 13 at the destination (for example, the boarding gate) is delayed due to lack of time.

The alert information may be transmitted to management server 11 via communicator 134, for example. When the alert information is received, management server 11 can, for example, notify the airport staff of the presence of mobility 13 that causes a delay in arrival at the boarding gate, and prompt a prompt response.

By including the information indicating the current position of mobility 13 in the alert information, for example, the discovery of mobility 13 that causes a delay in arrival at the destination becomes easy. Further, the alert information may include, for example, the information indicating that mobility 13 is moving toward the destination, and/or the estimated arrival time at the destination estimated by required time estimation unit 1393.

By including the information indicating that mobility 13 is moving toward the destination in the alert information, for example, the current status of the mobility user can be notified to the airport staff. The estimated arrival time at the destination is a time estimated in consideration of the congestion expected area and the time period thereof, so when the estimated arrival time is included in the alert information, for example, the estimated time when the mobility user arrives at the boarding gate can be accurately delivered to the airport staff to some extent.

In some cases, management server 11 may support the movement of mobility 13 to the destination by remotely controlling the operation state of mobility 13 that has transmitted the alert information, for example, by communication via network 17.

Further, alert processing unit 1398, in place of or in addition to the transmission of the alert information to management server 11, may output a signal that notifies the surroundings of mobility 13 of the fact that it is in an alert state, to an informer (not illustrated) mounted in mobility 13. The informer may be equipment that notifies the surroundings of the alert state by using one or both of sound and light.

By informing the surroundings of the alert state, for example, it becomes easier to discover mobility 13 that causes a delay in moving to the destination, and it is expected that the surrounding persons can support the movement. For example, the active support such as guiding the movement so that mobility 13 can move smoothly can be expected, and the passive support such as giving up the road so that mobility 13 can pass through a congested passage can be also expected.

Alert processing unit 1398 may transmit the alert information to management server 11 even when an abnormal state such as a failure of mobility 13 is observed, and/or when an operation for reporting an emergency situation to the airport-side system is performed through operation unit 131, for example. Thereby, for example, the airport staff can quickly replace mobility 13 in which an abnormality occurred and/or can quickly respond to an emergency.

The alert processing as described above can give the mobility user (for example, PRM) a sense of security of using the airport facility by mobility 13, so that the reliability of airport facilities can be improved, which in turn contributes to improving the image of airport facilities.

(Hardware Configuration Example of Mobility)

As illustrated in FIG. 4, when focusing on the hardware configuration, mobility 13 may include, for example, processor 1001, input device 1002, output device 1003, memory 1004, and storage 1005. Further, mobility 13 may include communication interface 1006 (communication IF), sensor 1007, driving unit 1008, and power supply circuit 1009. These elements (processor 1001 to power supply circuit 1009) may be connected to each other by bus 1010, for example.

Processor 1001 controls an operation of mobility 13. Processor 1001 is an example of a circuit or device having a computing capability. For processor 1001, for example, at least one of a central processing unit (CPU), a micro processing unit (MPU), and a graphics processing unit (GPU) may be used.

Input device 1002 may include, for example, operation unit 131 and input unit 132 illustrated in FIG. 3. Input device 1002 may include a device used for inputting information to mobility 13, for example, include at least one of an operation button and a microphone. Information may be input to processor 1001 through input device 1002.

Output device 1003 may include, for example, display unit 133 illustrated in FIG. 3. For example, output device 1003 may include at least one of a display (or monitor) corresponding to display unit 133, a printer, and a speaker. The display may be, for example, a touch panel type display. It can be considered that the touch panel type display corresponds to both input device 1002 and output device 1003.

Memory 1004 stores, for example, a program executed by processor 1001, and data or information processed according to the execution of the program. Memory 1004 may include a random access memory (RAM) and a read only memory (ROM). The RAM may be used as a work memory of processor 1001. The "program" may be referred to as "software" or an "application".

Storage 1005 stores a program executed by processor 1001, and data or information processed according to the execution of the program. Storage 1005 may store the above-described flight information and the information related to the mobility navi such as the map information. Information related to the mobility navi may be stored in storage 1005 in advance, or may be provided from management server 11 and stored in storage 1005, for example.

Storage 1005 may include a semiconductor drive device such as a hard disk drive (HDD) or a solid state drive (SSD). In addition or as an alternative to the semiconductor drive device, a non-volatile memory such as a flash memory may be included in storage 1005.

It may be considered that memory 1004 and storage 1005 correspond to storage unit 136 in FIG. 3.

The program may include a program that implements the above-described mobility navi (hereinafter, it may be abbreviated as a "mobility navi program"). All or a part of the program code forming the mobility navi program may be stored in memory 1004 and/or storage 1005, or may be incorporated in a part of the operating system (OS).

The program and/or data may be provided in a form recorded on a recording medium that can be read by processor 1001. Examples of the recording medium include a flexible disk, a CD-ROM, a CD-R, a CD-RW, an MO, a DVD, a Blu-ray disk, and a portable hard disk. A semiconductor memory such as a universal serial bus (USB) memory is also an example of the recording medium.

Further, the program and/or information may be provided (downloaded) to mobility 13 via network 17 from an application server (not illustrated), for example. For example, the program and/or information may be provided to mobility 13 through communication IF 1006 and stored in memory 1004 and/or storage 1005. Further, the program and/or data may be provided to mobility 13 through input device 1002 and stored in memory 1004 and/or storage 1005.

Communication IF 1006 corresponds to, for example, communicator 134 in FIG. 3, and is an interface for communicating with AP 15 and/or network 17. Communication IF 1006 includes, for example, a wireless interface for wireless communication with AP 15. Communication IF 1006 may also include a wired interface for wired communication with network 17.

By processor 1001 reading and executing the mobility navi program stored in storage unit 136, for example, mobility 13 functions as an example of a device that supports the mobility navi as described above.

For example, by processor 1001 executing the mobility navi program, controller 139 and each element of controller 139 (route search unit 1391 to alert processing unit 1398) illustrated in FIG. 3 are implemented.

Sensor 1007 and driving unit 1008 correspond to sensor 135 and driving unit 137 illustrated in FIG. 3, respectively, for example.

Power supply circuit 1009 may correspond to battery 138 illustrated in FIG. 3, for example. Power supply circuit 1009 supplies, for example, the electric power for operating each element (processor 1001 to driving unit 1008) illustrated in FIG. 4 to each element (processor 1001 to driving unit 1008).

<Configuration Example of Management Server>

Figure 5:
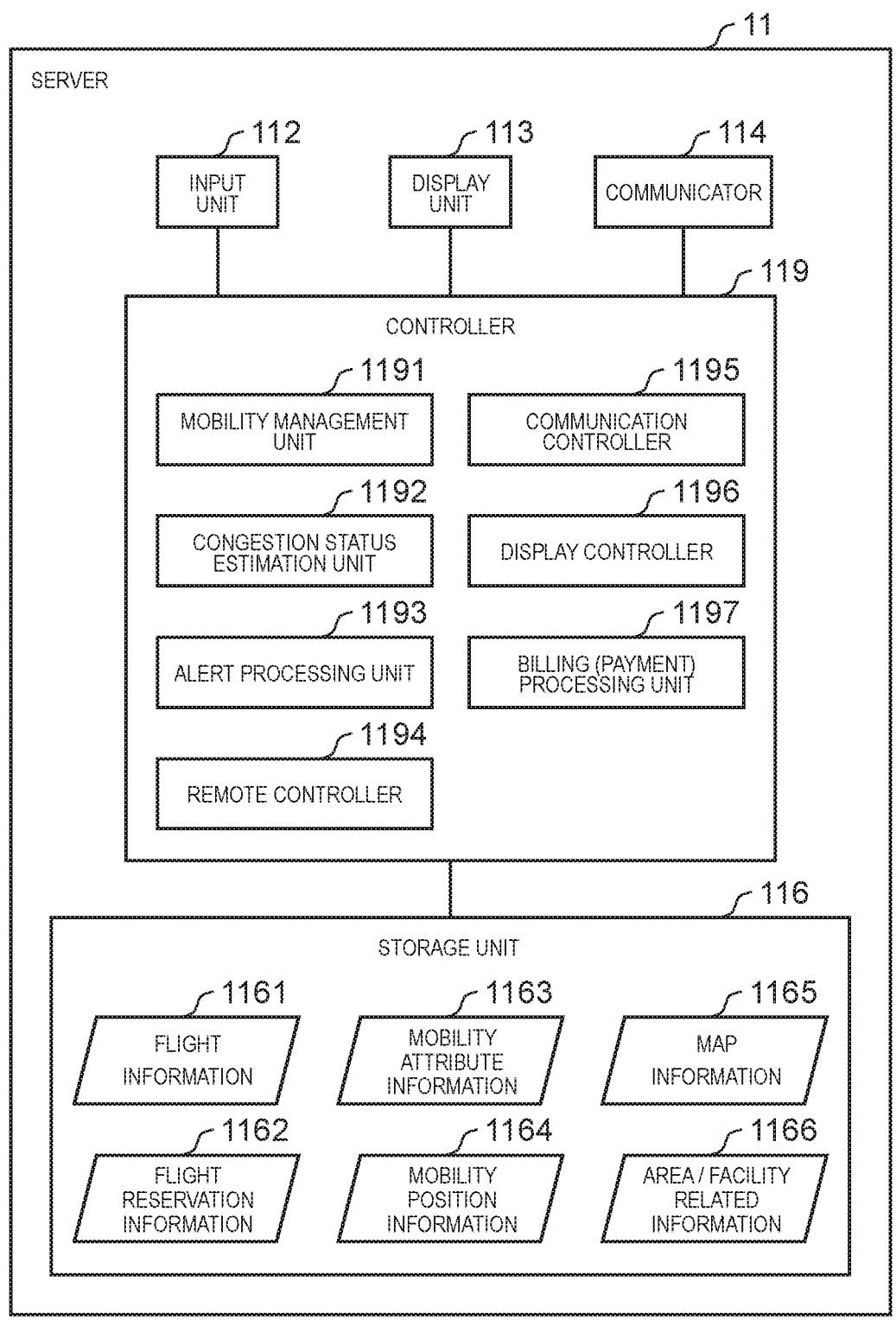
FIG. 5 is a block diagram illustrating an example of a functional configuration of a management server according to the exemplary embodiment.
Figure 11:
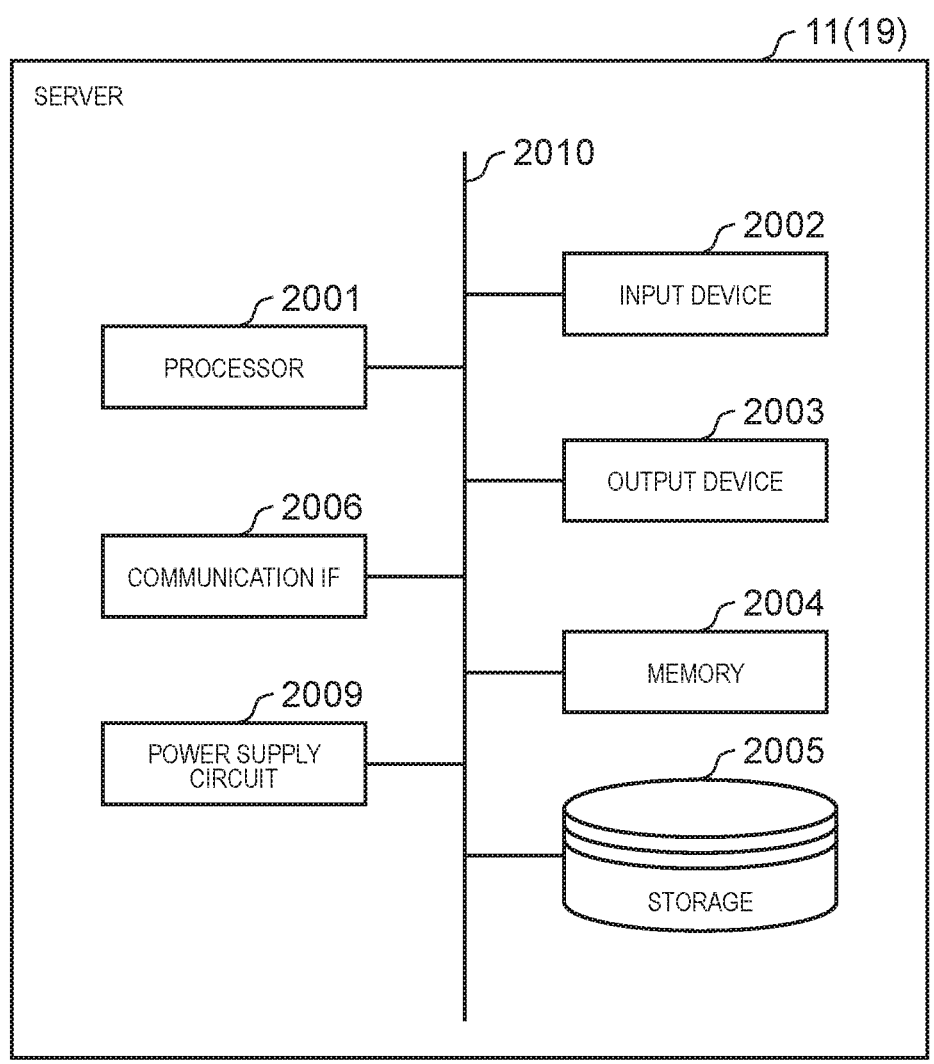
FIG. 11 is a block diagram illustrating an example of a hardware configuration of the management server according to the exemplary embodiment.

Next, a configuration example of management server 11 will be described. FIG. 5 is a block diagram illustrating an example of a functional configuration of management server 11 according to the exemplary embodiment, and FIG. 11 is a block diagram illustrating an example of a hardware configuration of management server 11 according to the exemplary embodiment. FIGS. 6 to 9 are diagrams illustrating examples of information formats stored and managed in management server 11.

(Functional Configuration Example of Management Server)

As illustrated in FIG. 5, management server 11 may include input unit 112, display unit 113, communicator 114, storage unit 116, and controller 119.

Input unit 112 receives an input of information, for example. For example, the input information by an operator of management server 11 is received by input unit 112 and input to controller 119.

Display unit 113 displays the information, for example. The information displayed on display unit 113 may be, for example, the information stored in storage unit 116 or the information generated by controller 119. For example, the information related to the mobility navi may be displayed on display unit 113.

For example, in association with the mobility navi, the map information of the passenger terminal, the facility information installed in the passenger terminal, and/or the advertisement information related to the facility information may be displayed on display unit 113.

Further, for example, the information indicating an area (for example, an area around the boarding gate) where congestion is expected in the route from the current position of mobility 13 to the destination and the time period thereof may be displayed on display unit 113.

Input unit 112 and display unit 113 may be configured with individual devices, or may be integrated into a device that can input and output (display) information in parallel, such as a touch panel display.

Communicator 114 communicates with one or both of mobility 13 and payment server 19 via AP 15 and/or network 17, for example. Therefore, communicator 114 may include, for example, a transmitter and a receiver (not illustrated) for information. The communication with one or both of mobility 13 and payment server 19 may be controlled by controller 119, for example.

For example, communicator 114 transmits/receives the information related to the mobility navi to/from mobility 13. Further, for example, when the advertisement information is provided to the mobility user in relation to the mobility navi, communicator 114 transmits/receives the information related to the billing processing with respect to the advertiser to/from payment server 19.

Controller 119 controls each of the operations of the above-described elements (input unit 112, display unit 113, communicator 114, and storage unit 116) to control the overall operation of management server 11, for example. When focusing on the mobility navi, controller 119 may include, for example, mobility management unit 1191, congestion status estimation unit 1192, alert processing unit 1193, remote controller 1194, communication controller 1195, display controller 1196, and billing processing unit 1197 (payment processing unit). Alert processing unit 1193, remote controller 1194, and/or billing processing unit 1197 may be optional.

Mobility management unit 1191 manages, for example, one or more mobilities 13 used in the passenger terminal. To control manage mobility 13, for example, in association with the ID of mobility 13 (mobility ID), the management of at least one information of the current position, the operation state, the attribute, and the movement history (movement log) of mobility 13 may be included. The management of the information may include, for example, accessing storage unit 116 and/or updating the information.

The attribute information of mobility 13 may include, for example, the information on the model, maximum speed, and size of mobility 13. The information indicating the current position and the operation state of mobility 13 may be acquired by the communication with mobility 13 via communicator 114, for example. The information indicating the current position of mobility 13 may be acquired using GPS, for example.

Congestion status estimation unit 1192 estimates the congestion expected area and the time period thereof based on, for example, the flight information and the information related to the location (for example, the boarding gate) associated with the flight.

By using, for example, the information on the current position and the destination of mobility 13 in addition to the flight information and the boarding gate information, congestion status estimation unit 1192 may estimate, for example, a congestion expected area and a time period thereof in the route along which mobility 13 moves from the current position to the destination.

At the airport facility, each of the passengers moves to the intended boarding gate based on the flight information in which a future event called flight is scheduled. Therefore, by using the flight information and the boarding gate information, it is possible to estimate the area where congestion is expected around each boarding gate and the time period thereof with a certain degree of accuracy.

Therefore, one or both of the number of persons reserved for the flight (or the number of persons who completed the check in procedure) and the mobility attribute information may not be used for estimating the congestion expected area and the time period thereof. The number of persons who completed the check in procedure may be abbreviated as "the number of check in persons".

When one or both of the number of persons reserved for the flight (or the number of check in persons) and the mobility attribute information are used together with the flight information and the boarding gate information, the estimation accuracy of the congestion expected area and the time period thereof can be improved.

Alert processing unit 1193 performs the alert processing, for example, when the alert information transmitted to management server 11 by mobility 13 is received through communicator 114. The alert processing may include, for example, processing of displaying the received alert information on display unit 113. By displaying the alert information on display unit 113, for example, it is possible to notify the airport staff of the presence of mobility 13 that causes a delay in arrival at the boarding gate, and prompt a response.

For example, when alert processing unit 1193 receives the alert information, remote controller 1194 remotely controls the operation state of mobility 13 that is the transmission source of the alert information by, for example, the communication via network 17. The remote control of mobility 13 can support the movement of mobility 13 to the destination.

Communication controller 1195 controls the communication between management server 11 and the external equipment (for example, mobility 13 and/or payment server 19) via communicator 114, for example.

Display controller 1196 controls the display state of display unit 113, for example, by giving display unit 113 a display control signal based on the information to be displayed on display unit 113.

Billing processing unit 1197 (payment processing unit) performs billing (or payment) processing of the advertisement fee when the mobility user is presented with advertisement information related to the facilities in the airport, such as restaurants, cafes, or souvenir shops, in the mobility navi, for example.

For example, when mobility 13 enters the area where the facility in which the advertisement information is presented is located on the movement route to the destination by the mobility navi, the billing processing is performed by the payment method designated in advance by the advertiser of the advertisement information.

Payment server 19 may be notified whether mobility 13 has entered a specific area from mobility 13 via management server 11 or without passing through management server 11, for example.

Storage unit 116 stores the information related to the mobility navi, for example. As a non-limiting example, flight information 1161, flight reservation information 1162, mobility attribute information 1163, mobility position information 1164, airport facility map information 1165, and area/facility related information 1166 may be stored in storage unit 116.

(Example of Information Format)

An example of flight information 1161 is illustrated in FIG. 6. In FIG. 6, flight information 1161 of "departure" is illustrated. Flight information 1161 is, for example, schedule information related to a plurality of flights, and may be displayed on, for example, an electronic bulletin board or the like in the airport facility.

As illustrated in FIG. 6, flight information 1161 may include or may be associated with, for example, information such as a flight number, a destination, scheduled departure time, a departure time change (may indicate presence or absence of cancellation), a check in procedure location, a boarding gate, and a check in status.

The boarding gate information is an example of information indicating an event occurrence location associated with a "flight" that is an example of an event scheduled to occur in flight information 1161.

FIG. 7 is a diagram illustrating an example of flight reservation information 1162. Flight reservation information 1162 is, for example, information indicating the reservation status (for example, the number of persons reserved) for each departure flight. As a non-limiting example, flight reservation information 1162 may include or may be associated with, the number of persons reserved for each departure flight and the number of persons who completed the check in procedure (hereinafter, it may be referred to as "the number of check in persons").

FIG. 8 is a diagram illustrating an example of mobility attribute information 1163. Mobility attribute information 1163 is information indicating the attributes of mobility 13, such as the movement speed of mobility 13, the operation mode, and the size of mobility 13.

As a non-limiting example, mobility attribute information 1163 may include or may be associated with the information indicating a model, a maximum supporting speed, and a size (L×W×H) for each identification information (ID) of mobility 13. As illustrated in FIG. 8, information indicating the movement history of mobility 13 (for example, movement log) may be included in or may be associated with mobility attribute information 1163.

The movement speed of mobility 13 may be, for example, substantially the same as the normal walking speed of a healthy person. For example, mobility 13 can move in a variable speed range of 0 km or more and 6 km or less per hour. The maximum speed of mobility 13 may be, for example, a range of 4 km or more and 6 km or less per hour.

Mobility 13 that moves at a maximum speed of 6 km or less per hour is treated (or classified) as a pedestrian in the Road Traffic Act in Japan. In consideration of safety of indoor movement such as at an airport facility, the movement speed of mobility 13 may be set to a speed lower than the maximum speed (for example, substantially 4 km per hour).

The information indicating the above-described operation mode of mobility 13 may be included in or may be associated with mobility attribute information 1163. The movement speed of mobility 13 may be different depending on the difference in the operation mode. For mobility 13 for which a plurality of operation modes are not prepared, mobility attribute information 1163 may not include the information indicating the operation mode.

The information indicating the size of mobility 13 (hereinafter it may be abbreviated as "size information") may include, for example, the information indicating the length (L), the width (W), and/or the height (H). The size of mobility 13 may affect, for example, whether mobility 13 can smoothly move or pass through the passage of the airport facility. For example, it can be said that the width (W) of mobility 13 easily affects whether mobility 13 can smoothly move or pass through the passage as compared with the length (L) and the height (H) of mobility 13.

Therefore, the information related to the movement speed, the operation mode, and/or the size of mobility 13 is an example of information that affects the estimation of the time it takes for mobility 13 to move from the current position to reach the destination through the passage in the airport facility.

For example, when the movement speed and/or the operation mode of mobility 13 is different, the estimated time may be different. When the size of mobility 13 is different, for example, the estimated time may be different because the ease of movement is different with the relationship with the passage width.

The movement log of mobility 13 may be managed, for example, in management server 11, by recording the current position of mobility 13 which is periodically estimated or detected in time series using the beacon signal transmitted by mobility 13 and/or the GPS.

Mobility position information 1164 is information indicating the current position of mobility 13 estimated or detected using the beacon signal transmitted by mobility 13 and/or the GPS, and is managed by mobility management unit 1191 described above, for example.

FIG. 9 is a diagram illustrating an example of area/facility related information 1166. As a non-limiting example, area/facility related information 1166 may include or may be associated with the information related to a "passage (passage ID)", the "passage width", and the "facility" for each "area (area ID)" when the airport facilities are divided into a plurality of areas as described later in FIG. 10.

Further, area/facility related information 1166 may include or may be associated with the information related to the "advertisement" and/or the "privilege" with respect to the facility user regarding the "facility" (for example, a lounge, a restaurant, a cafe, a store such as a souvenir shop).

Further, regarding the "advertisement" and/or the "privilege", the information related to the billing-destination (hereinafter, it is also referred to as "billing destination information") may be included in or may be associated with area/facility related information 1166. The billing destination information is, for example, information indicating a payment method designated by the advertiser or the like (withdrawal from a designated bank account, credit card payment, or the like).

For example, when it is determined (estimated) that the mobility user who is presented with the "advertisement" and/or the "privilege" in the mobility navi used the relevant facility, management server 11 (for example, billing processing unit 1197) executes the billing processing for payment server 19.

As an example of a case where it is determined (estimated) that the mobility user used the relevant facility, it is determined whether mobility 13 entered the area of the facility based on mobility position information 1164 and area/facility related information 1166.

Figure 10:
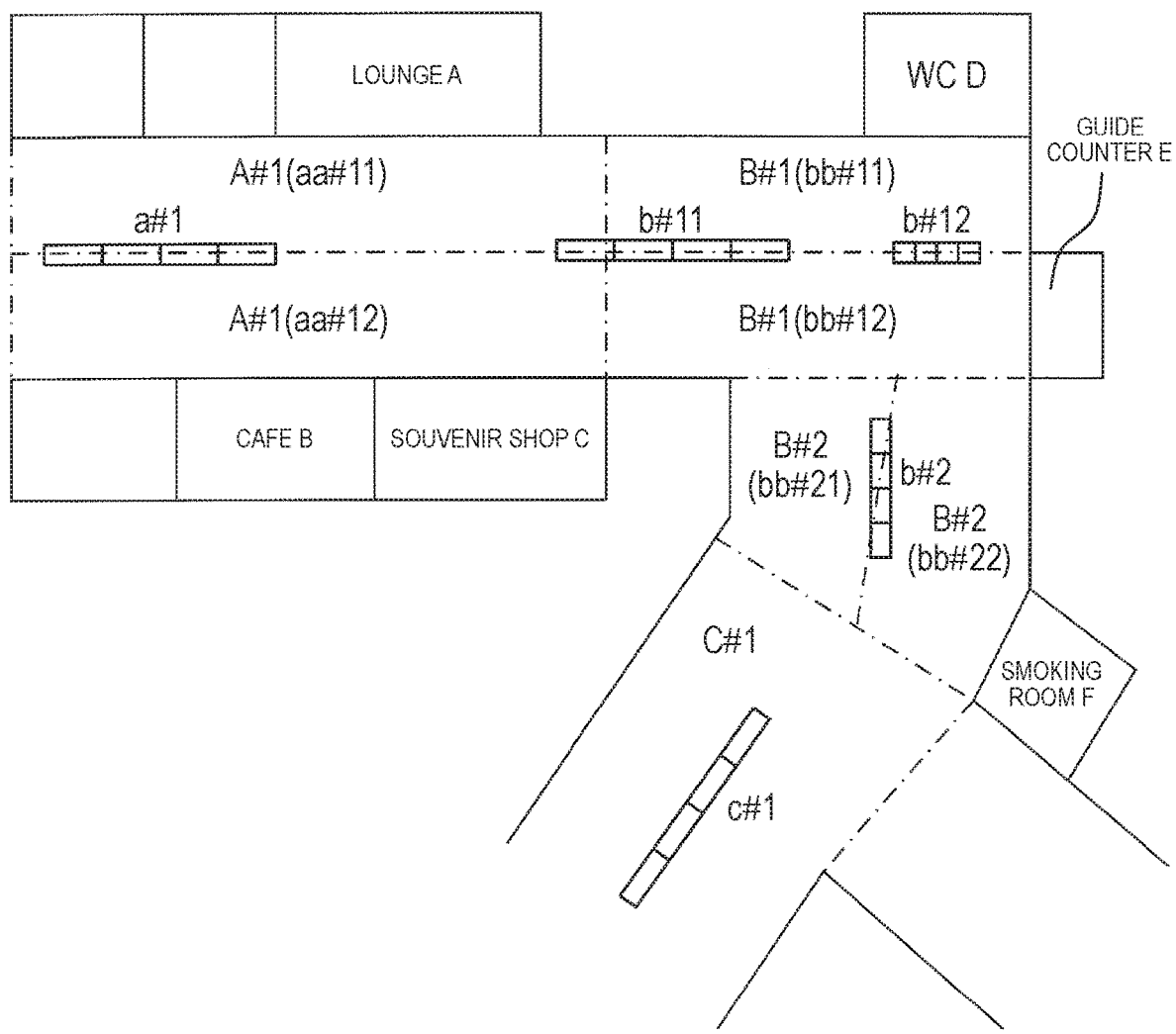
FIG. 10 is a diagram illustrating an example of area divisions in the airport facility according to the exemplary embodiment.

Next, an example of the area division in the airport facility (for example, a departure terminal) is illustrated in FIG. 10. A part of the floor map (plan view) of the departure terminal is schematically illustrated in FIG. 10, for example, area A #1, area B #1, area B #2, and area C #1 are illustrated.

Further, for example, lounge A, cafe B, and souvenir shop C are located beside the passage in area A #1. For example, toilet (WC) D and guide counter E are located beside the passage in area B #1. For example, smoking room F is located beside the passage in area B #2.

Further, installed object a #1 is located in area A #1, installed objects b #11 and b #12 are located in area B #1, installed object b #2 is located in area B #2, and installed object c #1 is located in area C #1. By installed object a #1, the passage in area A #1 is divided into two passages (passage IDs) aa #11 and aa #12.

Similarly, by installed objects b #11 and b #12, the passage in area B #1 is divided into two passages (passage IDs) bb #11 and bb #12. By installed object b #2, the passage in area B #2 is divided into two passages (passage IDs) bb #21 and bb #22.

Therefore, for example, as illustrated in FIG. 9, it can be specified (or identified) that lounge A is located beside the passage having the passage (passage ID) "aa #11" in the area having the area ID "A #1".

Regarding other facilities (cafe B, souvenir shop C, toilet D, information counter E, and smoking room F), similarly, the position can be specified (or identified) by the combination of area ID and passage ID.

The area division in the airport facility is not limited to the example in FIG. 10. For example, the area division method may be changed according to the shape of the floor on which the facility is located and/or the number of locations per unit area of the facility (in other words, location density) and the like. For example, the area having a high location density of facilities may have a smaller area size than the area having a low location density. The areas may be divided by facility.

The smaller the size of the divided area, the finer the mobility navi can be realized, but since the amount of information to be managed and/or processed increases, the two have a trade-off relationship. The division size may be optimized in consideration of such a trade-off.

Further, the area division may be managed using information indicating a boundary line that divides the area. For example, in the area/facility related information illustrated in FIG. 9, the information corresponding to area ID, passage ID, and/or passage width may be managed by the information indicating the boundary line indicated by the one-dot chain line in FIG. 10.

(Hardware Configuration Example of Management Server)

As illustrated in FIG. 11, when focusing on the hardware configuration, management server 11 may include, for example, processor 2001, input device 2002, output device 2003, memory 2004, and storage 2005. Further, management server 11 may include communication IF 2006 and power supply circuit 2009. These elements (processor 2001 to communication IF 2006, and power supply circuit 2009) may be connected to each other by bus 2010, for example.

Processor 2001 controls an operation of management server 11. Processor 2001 is an example of a circuit or device having a computing capability. At least one of a CPU, an MPU, and a GPU may be used for processor 2001, for example.

Input device 2002 may include input unit 112 illustrated in FIG. 5, for example. Input device 2002 may include a device used for inputting information to management server 11, for example, include at least one of an operation button, a keyboard, a mouse, and a microphone. Information may be input to processor 2001 through input device 2002.

Output device 2003 may include display unit 113 illustrated in FIG. 5, for example. For example, output device 2003 may include at least one of a display (or monitor) corresponding to display unit 113, a printer, and a speaker. The display may be, for example, a touch panel type display. It can be considered that the touch panel type display corresponds to both input device 2002 and output device 2003.

Memory 2004 stores, for example, a program executed by processor 2001, and data or information processed according to the execution of the program. Memory 2004 may include a RAM and a ROM. The RAM may be used as a work memory of processor 2001.

Storage 2005 stores a program executed by processor 2001, and data or information processed according to the execution of the program. At least one of flight information 1161 to area/facility related information 1166 illustrated in FIG. 5 may be stored in storage 2005.

Storage 2005 may include a semiconductor drive device such as a hard disk drive (HDD) or a solid state drive (SSD). In addition or as an alternative to the semiconductor drive device, a non-volatile memory such as a flash memory may be included in storage 2005.

It may be considered that memory 2004 and storage 2005 correspond to storage unit 116 in FIG. 5.

The program may include a mobility navi program. All or a part of the program code forming the mobility navi program may be stored in memory 2004 and/or storage 2005, or may be incorporated in a part of the operating system (OS).

The program and/or data may be provided in a form recorded on a recording medium that can be read by processor 2001. Examples of the recording medium include a flexible disk, a CD-ROM, a CD-R, a CD-RW, an MO, a DVD, a Blu-ray disk, and a portable hard disk. A semiconductor memory such as a USB memory is also an example of the recording medium.

Further, the program and/or information may be provided (downloaded) to management server 11 via network 17 from an application server (not illustrated), for example. For example, the program and/or information may be provided to management server 11 through communication IF 2006 and stored in memory 2004 and/or storage 2005. Further, the program and/or data may be provided to management server 11 through input device 2002 and stored in memory 2004 and/or storage 2005.

Communication IF 2006 corresponds to, for example, communicator 114 in FIG. 5, and is an interface for communicating with AP 15, network 17, and/or payment server 19. Communication IF 2006 may include a wired interface for wired communication with network 17, and/or payment server 19, for example.

By processor 2001 reading and executing the mobility navi program stored in storage unit 116, for example, management server 11 functions as an example of a device that supports the mobility navi as described above.

For example, by processor 2001 executing the mobility navi program, controller 119 and each element of controller 119 (mobility management unit 1191 to billing processing unit 1197) illustrated in FIG. 5 are implemented.

Power supply circuit 2009 supplies, for example, the electric power for operating each element (processor 2001 to communication IF 2006) illustrated in FIG. 11 to each element (processor 2001 to communication IF 2006).

The hardware configuration example of payment server 19 may be the same as the hardware configuration example of management server 11 illustrated in FIG. 11. Payment server 19 has, for example, a functional unit that performs the payment processing based on the information related to a billing destination and a payment method, which is acquired by the communication with management server 11.

<Operation Example>

Hereinafter, an operation example of navigation system 1 described above will be described with reference to FIGS. 12 to 20.

(Operation Example of Mobility)

Figure 12:
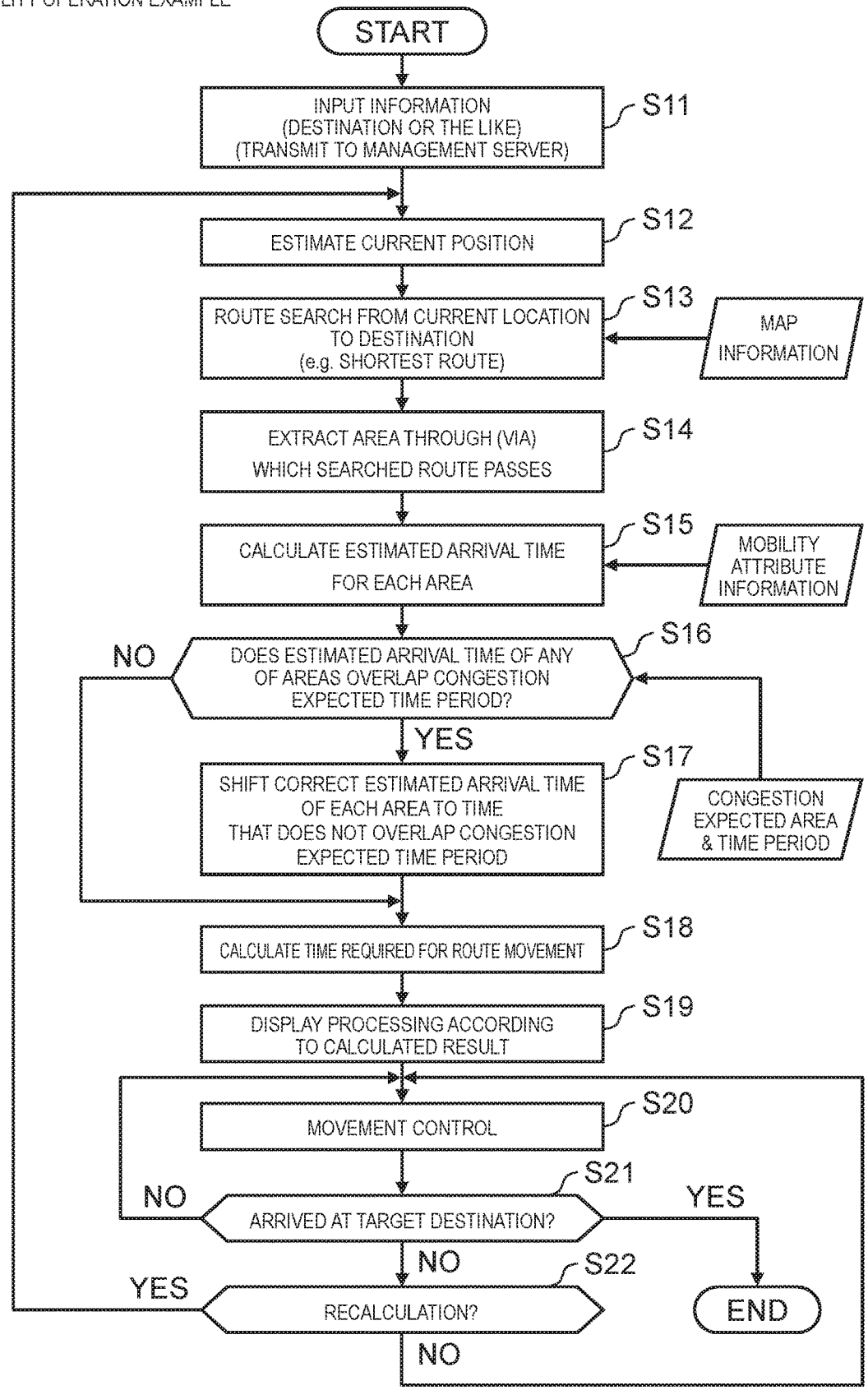
FIG. 12 is a flowchart illustrating an example of an operation of the mobility according to the exemplary embodiment.

FIG. 12 is a flowchart illustrating an example of an operation of mobility 13 according to the exemplary embodiment. The flowchart illustrated in FIG. 12 may be executed by controller 139 in FIG. 3 (processor 1001 in FIG. 4), for example.

As illustrated in FIG. 12, mobility 13 causes controller 139 to receive an input of information indicating the destination of mobility 13 (for example, a facility in the airport such as a boarding gate) through input unit 132 or communicator 134 (S11). The information indicating the current position of mobility 13 may be received by controller 139 through input unit 132 or communicator 134, for example. The received information may be transmitted to management server 11 through communicator 134.

The input of the information indicating the destination may be performed, for example, by the mobility user selecting a location corresponding to the destination on the map displayed on the display screen of display unit 133.

When controller 139 receives the information indicating the destination, controller 139 causes current position detector 1392 to detect (or estimate) the current position of mobility 13 (S12). The order of the processing S11 and the processing S12 may be interchanged with each other, or may be executed in parallel.

Thereafter, controller 139 searches for a route from the current position of mobility 13 to the destination (for example, the shortest route) by route search unit 1391 based on map information 1165 stored in storage unit 136 (S13).

Map information 1165 may be, for example, the information received from management server 11 through network 17 and/or AP 15 in communicator 134, or the information received by the LED light of the digital signage.

When the route is searched by the route search, route search unit 1391 extracts, for example, one or more areas (hereinafter, it may be abbreviated as "passing through area" for convenience.) through which the searched route passes (in other words, passes through) (S14). The "passing through area" corresponds to one of the divided areas when the map information of the airport facility is divided into a plurality of areas as described above, for example.

When one or more passing through areas are extracted by route search unit 1391, controller 139 causes, for example, required time estimation unit 1393 to calculate the estimated arrival time of mobility 13 for each passing through area based on the speed information in mobility attribute information 1163 (S15).

When the estimated arrival time for each passing through area is calculated, required time estimation unit 1393 determines whether any passing through area and estimated arrival time overlap the congestion expected area and the time period thereof, for example (S16).

The information on the congestion expected area and the time period thereof is estimated by management server 11 and received from management server 11, for example. For example, as will be described later with reference to FIG. 14, management server 11 estimates the congestion expected area and the time period thereof by receiving the destination information transmitted by mobility 13 in processing S11, and the estimated result is transmitted to mobility 13 destination.

As a result of the determination in S16, when there is a passing through area that overlaps the congestion expected area and the time period thereof (YES in S16), required time estimation unit 1393 corrects the estimated arrival time for each area calculated in S15, for example (S17).

For example, required time estimation unit 1393 corrects the estimated arrival time for each area to time that does not overlap with a time period where congestion is expected (in other words, time that avoids a time period where congestion is expected). This time correction may be, for example, a shift correction in which the time correction for one passing through area is performed and the same time correction is performed for other passing through areas.

The time correction may be a correction of the time period before the time period where congestion is expected or may be a correction of the time period after the time period where congestion is expected. For convenience, the former may be referred to as "advance correction" and the latter may be referred to as "after correction".

Figure 13:
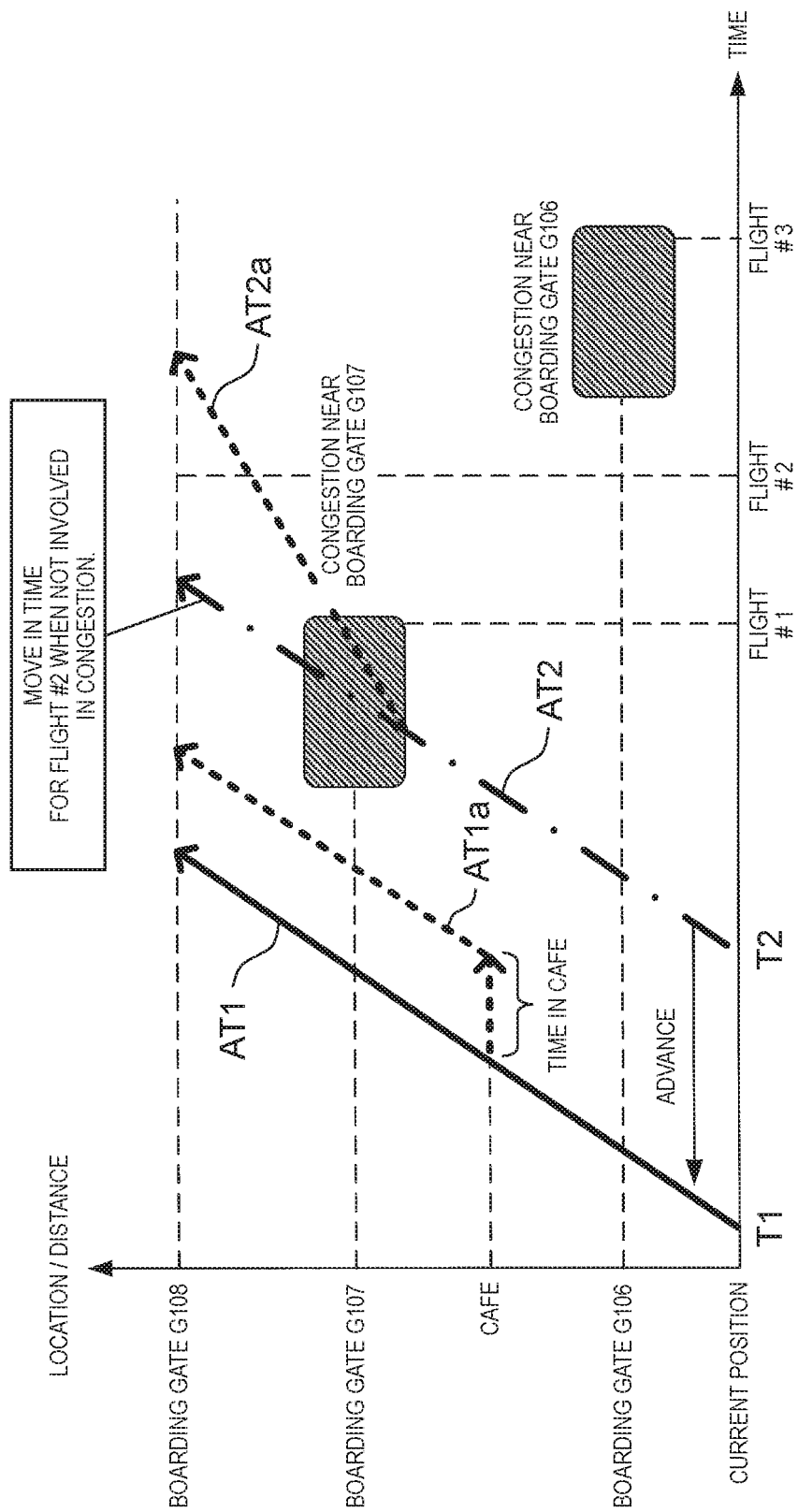
FIG. 13 is a graph illustrating an example of an "advance correction" of the departure time from a current position of the mobility according to the exemplary embodiment.

An example of the "advance correction" is illustrated in FIG. 13. The vertical axis of the graph illustrated in FIG. 13 represents the distance (or location) from the current position of mobility 13, and the horizontal axis of the graph illustrated in FIG. 13 represents the time.

For example, the vertical axis indicates that the distance from the current position increases in the order of boarding gate G106, the cafe, boarding gate G107, and boarding gate G108.

Further, the horizontal axis indicates that the departure time arrive in the order of flight #1 of boarding gate G107, flight #2 of boarding gate G108, and flight #3 of boarding gate G106.

In the example in FIG. 13, the fact that the congestion in the vicinity of boarding gate G107 increases as the departure time of flight #1 approaches, and the congestion in the vicinity of boarding gate G106 increases as the departure time of flight #3 approaches, is indicated by the hatched area.

When the departure time of flight #1 has passed, the congestion that has occurred in the vicinity of boarding gate G107 is resolved or alleviated. Similarly, when the departure time of flight #3 has passed, the congestion that has occurred in the vicinity of boarding gate G106 is resolved or alleviated.

The "advance correction" when the flight scheduled to be boarded by the mobility user is flight #2 of boarding gate G108 will be described. In FIG. 13, arrow AT2 indicated by a one-dot chain line represents a movement in the case where the mobility user can move smoothly to boarding gate G108 which is the destination on the movement route without getting involved in congestion.

For example, as indicated by arrow AT2 with one-dot chain line, mobility 13 departs from the current position toward boarding gate G108 at time T2, and moves to boarding gate G108 at a certain average speed. Unless mobility 13 is involved in congestion on the movement route, mobility 13 can reach boarding gate G108 by the departure time of flight #2 by the movement indicated by arrow AT2 with one-dot chain line.

However, in the example in FIG. 13, the movement indicated by arrow AT2 with one-dot chain line overlaps the congestion expected area in the vicinity of boarding gate G107, where the degree of congestion increases as the departure time of flight #1 approaches. Therefore, mobility 13 may not be able to move smoothly in the congestion expected area. The overlapping of the movement indicated by arrow AT2 with one-dot chain line with the congestion expected area in the vicinity of boarding gate G107 is an example in which "YES" is determined in processing S16 in FIG. 12.

When mobility 13 encounters the congestion expected area, in order to decrease the average movement speed of mobility 13, for example, as illustrated by arrow AT2a with dotted line in FIG. 13, the arrival at boarding gate G108 may be delayed for the departure time of flight #2.

Therefore, in processing S17 in FIG. 12, for example, as indicated by arrow AT1 with solid line in FIG. 13, the departure time from the current position of mobility 13 is shifted to time T1 which is earlier than time T2 and which is in time with the departure time of flight #2 (in other words, advance). In this way, the correction to advance the departure time may be referred to as an "advance correction". The movement represented by arrow AT1 with solid line is treated as having the same average movement speed as the movement represented by arrow AT2 with one-dot chain line.

By the "advance correction", mobility 13 can smoothly move on the movement route to boarding gate G108 which is the destination of mobility 13, without getting involved in congestion that is expected to occur in the vicinity of boarding gate G107. Therefore, it is possible to increase the certainty that the mobility user can arrive at boarding gate G108 by the departure time of flight #2 scheduled to board.

An example of the "advance correction" is illustrated in FIG. 13, but when the time is in time for the departure time of flight #2, the correction of the departure time from the current position may be "after correction" in which the time is delayed later than the time T2.

Further, in FIG. 13, when it is assumed that the mobility user has started moving toward boarding gate G108 at departure time T1, as illustrated by arrow AT1a with dotted line, even when the mobility user stops by a cafe located on the way of the route, it may be in time for the departure time of flight #2.

Therefore, the mobility user can stop by and spend time at the cafe while moving on the route. As described above, the correction of the departure time from the current position may be performed in consideration of the information on the facilities in the airport that the mobility user can stop by while moving on the route.

The graph illustrated in FIG. 13 may be displayed on display unit 133 of mobility 13 (or the display unit of the UE possessed by the mobility user). The graph illustrated in FIG. 13 is obtained by, for example, performing processing S15 and/or processing S16.

The fact that the graph illustrated in FIG. 13 is displayed on display unit 133 (or the display unit of the UE) of mobility 13 is a non-limiting example of presentation of the estimated result of the congestion and time period using the flight information described above to mobility 13.

With such a graph display, for example, it is possible to improve the visibility of the time at which the mobility should depart from the current position towards the destination (for example, the boarding gate), the facilities in the airport where the mobility user is likely to stop by while moving on the route, and/or the margin time (in other words, waiting time) until the flight time scheduled to be boarded.

Therefore, for example, the selecting options of future actions (in other words, action pattern or action style candidates) that the mobility user can take during the waiting time before the flight time can be expanded. The display form of the estimated result is not limited to the graph display as illustrated in FIG. 13, and may be a display form using a table or other display forms.

After the time correction (S17 in FIG. 12) as described above, for example, as illustrated in FIG. 12, required time estimation unit 1393 calculates the time required for mobility 13 to move from the current position to the destination based on the corrected estimated arrival time of each of the passing through areas (S18). The time taken for mobility 13 to move from the current position to the destination may be abbreviated as the "required movement time" for convenience.

When the estimated arrival time for each passing through area does not overlap with the time period where the congestion is expected (S16: NO), required time estimation unit 1393 may skip the processing of S17. That is, required time estimation unit 1393 may execute the calculation of the required movement time (S18) without performing the correction of the estimated arrival time of each of the passing through areas.

When the required movement time is calculated by required time estimation unit 1393, controller 139 displays information according to the required movement time calculated by display controller 1396 on display unit 133, for example (S19).

The "information in accordance with the required movement time" displayed on display unit 133 may be, for example, the information itself indicating the calculated required movement time, or may be the information indicating the time at which mobility 13 should depart from the current position (in other words, "movement start time"), which is calculated based on the required movement time. For example, time T1 illustrated in FIG. 13 corresponds to the "movement start time".

Further, the information indicating the time that indicates the estimated arrival time to the destination when mobility 13 immediately starts moving toward the destination at the current time may correspond to the "information in accordance with the required movement time". A plurality of display forms related to the display of the above time information may be appropriately combined in two or more.

Thereafter, for example, the driving mechanism of mobility 13 is controlled based on the information on the route searched in the map information and the information on sensor 135 by driving controller 1397 of controller 139, thereby mobility 13 autonomously moves on the searched route (S20).

In other words, mobility 13 moves the searched route by the automatic operation function. However, a part of or all of the control when mobility 13 moves on the searched route may be performed according to the manual operation of the mobility user on operation unit 131.

The information indicating the current position, the movement direction, and/or the movement speed of mobility 13 may be displayed in real time on display unit 133 by display controller 1396 in association with the movement control of mobility 13, for example.

Thereafter, controller 139 determines whether mobility 13 has arrived at the destination within the required movement time, for example (S21). Whether mobility 13 has arrived at the destination may be determined by, for example, whether the current position detected by the current position detector 1392 corresponds to the destination in the map information.

When it is determined that mobility 13 has arrived at the destination within the required movement time (S21: YES), controller 139 may end the processing. The end of processing may be triggered by the fact that controller 139 detects the confirmation operation of the user for the notification after notifying the user that mobility 13 has arrived at the destination.

Further, after mobility 13 arrives at the destination, for example, by the automatic collection mode, controller 139 may move mobility 13 to a predetermined collection position by the automatic operation. Thereby, for example, it is possible to reduce the work burden of collecting mobility 13 on the airport staff after the use is completed.

The notification of arrival at the destination to the user may be performed by the display control of display unit 133 by display controller 1396, or may alternatively or additionally be performed by the audio output through output device 1003.

On the other hand, when mobility 13 has not arrived at the destination (S21: NO), controller 139 may determine whether to recalculate the required movement time by required time estimation unit 1393 (S22). For example, it may be determined to recalculate the required movement time by the occurrence of a periodic or aperiodic event (it may be referred to as an "event trigger" for convenience).

The event trigger is used, for example, to monitor (or check) whether a change has occurred in the congestion expected area and the time period thereof while mobility 13 is moving to the destination. Non-limiting examples of the event trigger include arrival of a predetermined monitoring period, change in flight information 1161 and/or change in destination.

The monitoring period may, for example, be set in minutes such as several minutes. The shorter the monitoring period is set, the quicker the recalculation is possible according to changes in the congestion expected area and the time period thereof, while the recalculation load increases, thereby the two have a trade-off relationship. The monitoring period may be optimized in consideration of such trade-off.

Examples of changing flight information 1161 include changing the departure time (for example, delay) due to weather or the like, and changing the boarding gate. The destination of mobility 13 can be changed by changing the boarding gate. When the destination is changed, for example, required time estimation unit 1393 determines to recalculate the required movement time from the current position to the changed destination (for example, the boarding gate).

For example, management server 11 may notify the user whether flight information 1161 is changed. For example, the determination that the recalculation is affirmative may be made when the new estimated result related to the congestion expected area and the time period thereof is received from management server 11 through communicator 134 by changing flight information 1161.

When the recalculation of the required movement time is positively determined (S22: YES), controller 139 re-executes, for example, the processing after the processing S12 described above. When the recalculation of the required movement time is negatively determined (S22: NO), controller 139 re-executes, for example, the processing after the processing S20 described above.

As described above, according to the above-described operation example, based on the flight information and the information related to the boarding gate associated with the flight, congestion that may occur in the future around the boarding gate and the time thereof are estimated.

Based on the estimated result, information related to the time the mobility user can reach the boarding gate while avoiding the congestion expected area and time period, and the time at which the mobility user should depart the current position, is calculated and presented to the mobility user. Therefore, it contributes to the smooth movement of the mobility user to the boarding gate.

For example, the departure time from the current position with the "advance correction" (or "after correction") is presented to the mobility user. In this way, even when a detour or alternative route to the destination cannot be selected like in the airport facility, it is possible to increase the probability that the mobility user can smoothly reach the destination without getting involved in congestion during the movement.

Since the estimated results of the congestion that may occur in association with the scheduled future flights and the time thereof are presented to the mobility user, it is possible to reduce the possibility of being involved in congestion while moving the route to the target boarding gate after the mobility user starts moving to the boarding gate.

A part or all of the processing executed in mobility 13 may be executed in management server 11. For example, a part or all of processing S12 to S18 illustrated in FIG. 12 may be executed in management server 11. In other words, a part or all of route search unit 1391, current position detector 1392, and required time estimation unit 1393 illustrated in FIG. 3 are provided in management server 11 (for example, controller 119: see FIG. 5).

The result of the processing executed in management server 11 may be transmitted from management server 11 to mobility 13. Mobility 13 may control the display of display unit 133 by controller 139 (for example, display controller 1396) based on the processing result received from management server 11.

(Operation Example of Management Server)

Figure 14:
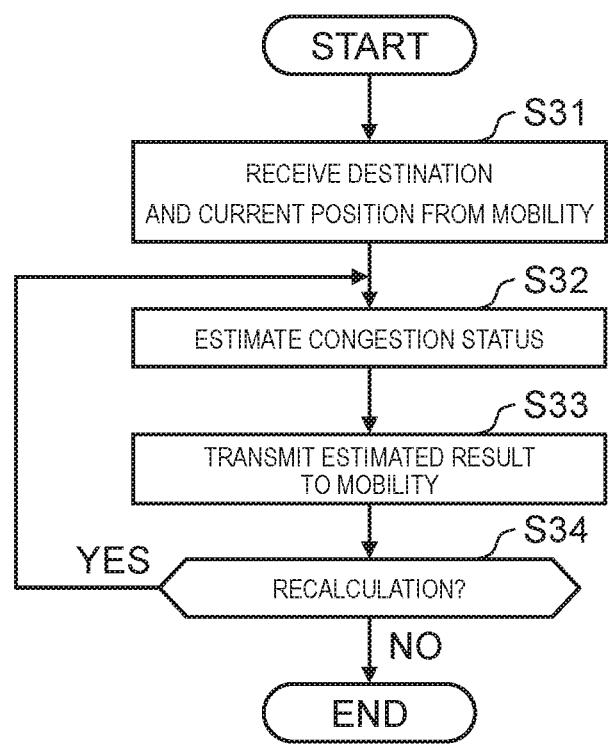
FIG. 14 is a flowchart illustrating an example of an operation of the management server according to the exemplary embodiment.

Next, an example of an operation of management server 11 will be described with reference to the flowchart in FIG. 14. As illustrated in FIG. 14, management server 11 receives, for example, the information indicating the destination and the information indicating the current position transmitted by mobility 13 in processing S11 in FIG. 12 in communicator 114 (S31). In management server 11, for example, when the current position of mobility 13 is managed using the GPS and/or beacon signal, the information indicating the current position of mobility 13 may not be received by communicator 114.

When the information indicating the destination is received by communicator 114, management server 11 estimates the future congestion status in the airport facility (for example, passenger terminal) by congestion status estimation unit 1192 of controller 119, for example (S32).

For example, congestion status estimation unit 1192 estimates the congestion expected area and the time period thereof based on flight information 1161 and the boarding gate information. Congestion expected area and the time period thereof may be estimated, for example, based on the information on the number of persons reserved for each flight (in other words, for each boarding gate), the number of check in persons for each flight, and the average movement speed when walking to the target boarding gate after completing check in.

The flight reservation status for each boarding gate and the check in completion status for each flight can be specified based on, for example, flight information 1161 illustrated in FIG. 6 and flight reservation information 1162 illustrated in FIG. 7.

By treating the average movement speed of a person on foot as a predetermined value, congestion status estimation unit 1192 can estimate an area where congestion is expected in the airport facility and the time period thereof based on flight information 1161 and flight reservation information 1162.

The degree of congestion of the area where congestion is expected may be represented by, for example, the number of persons per unit area in the divided area, or may be represented by a numerical value obtained by converting the number of persons per unit area into a percentage of 0% or more and 100% or less, or a level (congestion level) in which the percentage is divided stepwise. The "level" may be read as "degree".

As a non-limiting example, a range of 0% or more and less than 30% may be associated with a "congestion level 1", a range of 30% or more and less than 70% may be associated with a "congestion level 2", and a range of 70% or more and 100% or less may be associated with a "congestion level 3". The association of congestion levels is not limited to the present example (three levels), and may be two levels or four or more levels. Further, the congestion level may be determined based on the degree of remaining of the space through which mobility 13 can pass with respect to the number of persons per unit area.

Congestion status estimation unit 1192 transmits the information indicating the congestion expected area and the time period thereof, which are the estimated results, to mobility 13 that is the transmission source of the information indicating the destination through communicator 114, for example (S33).

After transmitting the estimated result, congestion status estimation unit 1192 determines whether to re-estimate (or recalculate) the congestion expected area and the time period thereof (S34).

For example, congestion status estimation unit 1192 may determine to perform recalculation of the congestion expected area and the time period thereof by the periodic or aperiodic event occurrence (for example, the event trigger described above).

When it is determined that it is necessary to recalculate the congestion expected area and the time period thereof (S34: YES), congestion status estimation unit 1192 re-executes the processing after the processing S32. When it is determined that it is not necessary to recalculate the congestion expected area and the time period thereof (S34: NO), congestion status estimation unit 1192 may end the processing.

The congestion expected area and the time period thereof may be estimated based on, for example, the information related to the flight information and the location such as a boarding gate associated with the flight information and the accumulation (log) of past estimated results. By using the past estimated result together, for example, it is possible to improve the estimation accuracy of the congestion that may occur in the vicinity of the boarding gate and time period.

A part or all of the processing executed in management server 11 may be executed in mobility 13. For example, the estimation processing S32 of the congestion expected area and the time period thereof may be executed in mobility 13. In other words, congestion status estimation unit 1192 illustrated in FIG. 5 may be included in mobility 13 (controller 139: see FIG. 3).

(Mobility Operation Option 1: Information Presentation on Facilities in Airport Such as Stores)

Next, an example of Option 1 (information presentation on facilities in the airport) related to an operation example of mobility 13 will be described with reference to the flowchart in FIG. 15. The flowchart in FIG. 15 may be executed, for example, in the processing S19 in FIG. 12.

Figure 15:
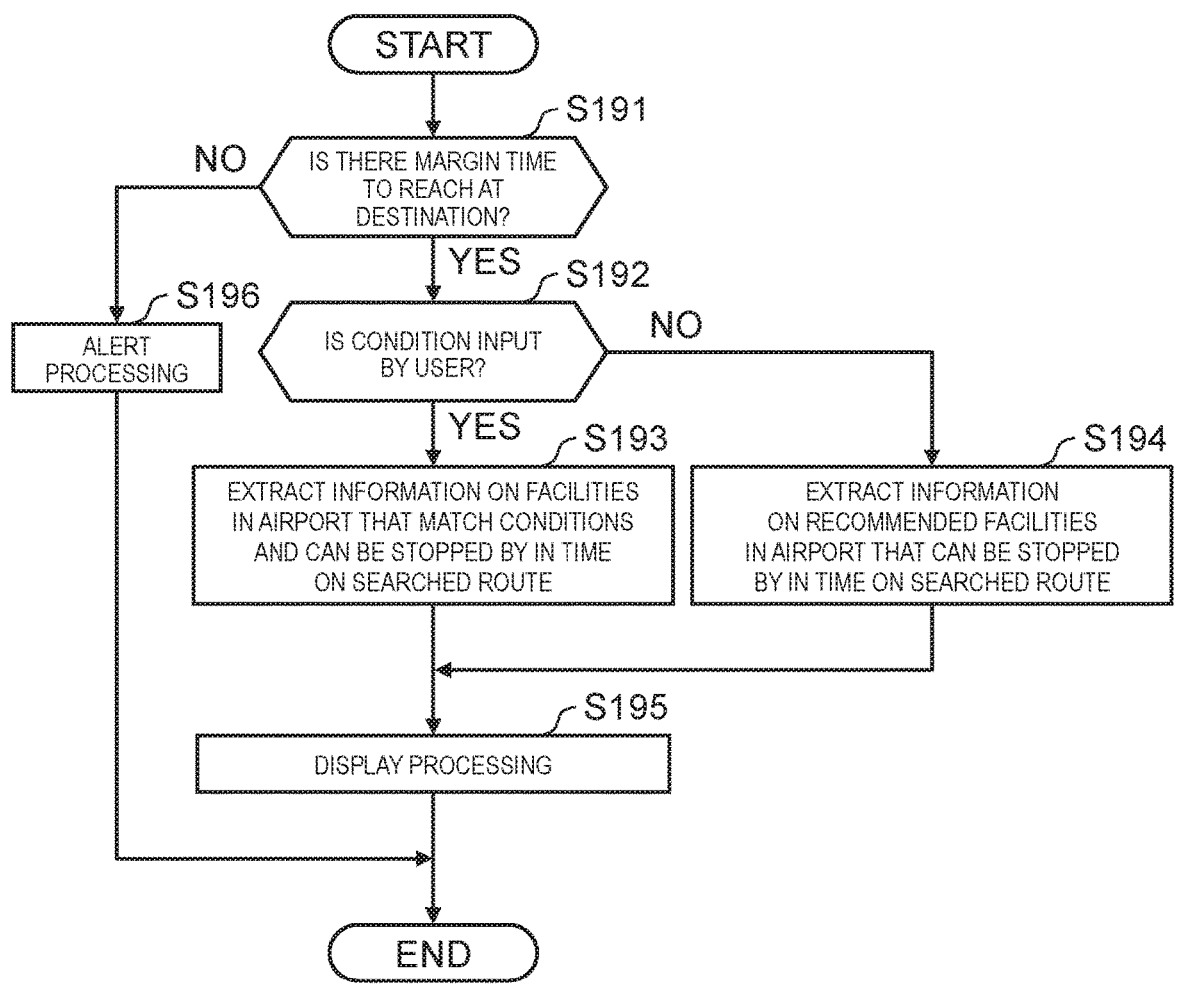
FIG. 15 is a flowchart illustrating an example of an option 1 (information presentation of facility in an airport) related to an operation example of the mobility according to the exemplary embodiment.

As illustrated in FIG. 15, mobility 13 determines, for example, whether the estimated arrival time has a margin of predetermined time or more with respect to the time at which mobility 13 should arrive at the destination based on the required movement time calculated in processing S18 in FIG. 12 (S191). This determination may be performed by required time estimation unit 1393 of controller 139, for example. The predetermined time (in other words, the threshold value time) may be set in a range of several minutes to several tens of minutes as a non-limiting example. The threshold value time may be set statically or may be set dynamically.

When it is determined that there is a margin (S191: YES), controller 139 determines whether the condition is input (or designated) by the mobility user through input unit 132 (or communicator 134), for example (S192). The input of the condition through communicator 134 is, for example, an input via the communication between mobility 13 and the UE of the mobility user. The "condition" may be read as a "rule", a "policy", or a "priority".

A non-limiting example of a "condition" is a condition related to the facilities in the airport (for example, lounges, restaurants, cafes, or souvenir shops) that the mobility user wishes to stop by when the mobility user has a temporal margin by the time at which the mobility user should arrive at the destination (for example, the boarding gate).

When there is an input of "condition" (S192: YES), for example, controller 139 acquires the information on the facilities in the airport where the mobility user can stop by the estimated arrival time at the destination on the searched route based on facility related information 1161 (for example, see FIG. 9) (S193). This acquisition processing may be performed by facility related information management unit 1394, for example.

The acquired information on the facilities in the airport is displayed on display unit 133 of mobility 13 by display controller 1396, for example (S195). When there is no input of "condition" by the mobility user (S192: NO), for example, display controller 1396 may perform the control of maintaining the display in processing S19 in FIG. 12 in the display processing of S195.

When there is no input of "condition" by the mobility user (S192: NO), controller 139 may acquire the information on the recommended facilities in the airport where the mobility user can stop by the estimated arrival time at the destination on the searched route (S194), and display the acquired information on display unit 133 (S195).

The information on facilities in the airport (for example, lounges, restaurants, cafes, or souvenir shops) recommended for the mobility user may be acquired by the communication between mobility 13 and management server 11, for example.

In determination processing S191, when it is determined that the estimated arrival time of mobility 13 has no margin with respect to the time at which mobility 13 should arrive at the destination (NO), controller 139 may cause alert processing unit 1398 to execute the alert processing (S196). An example of the alert processing will be described later with reference to FIG. 19.

(Mobility Operation Option 2: Billing Related Processing)

Figure 16:
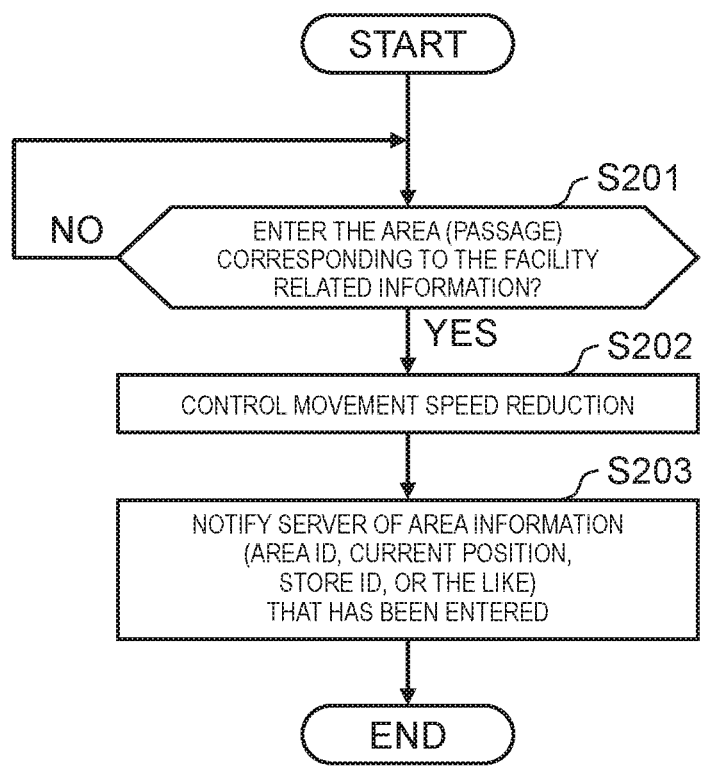
FIG. 16 is a flowchart illustrating an example of an option 2 (billing related processing) related to an operation example of the mobility according to the exemplary embodiment.

Next, an example of Option 2 (billing related processing) related to an operation example of mobility 13 will be described with reference to the flowchart in FIG. 16. The flowchart in FIG. 16 may be executed in the processing related to the movement control described in S20 in FIG. 12, for example.

For example, mobility 13 may determine whether mobility 13 has entered the divided area corresponding to the information on the facilities in the airport displayed on display unit 133 (S201). This determination may be performed by current position detector 1392 of controller 139, for example.

For example, based on the detection result of the current position of mobility 13 and area/facility related information 1166, current position detector 1392 may determine whether mobility 13 has entered the divided area corresponding to the information on the facilities in the airport displayed on display unit 133.

Area/facility related information 1166 used for the above determination may be provided to mobility 13 by the communication between mobility 13 and management server 11, for example.

When the determination result is a positive result (S201: YES), for example, current position detector 1392 may control driving controller 1397 to reduce the movement speed of mobility 13 or temporarily stop mobility 13 (S202).

Thereby, when mobility 13 reaches the facility in the airport where the mobility user wishes to stop by or the divided area where the facility in the airport recommended for the mobility user is located, mobility 13 autonomously reduces the movement speed or temporarily stops.

Therefore, it is possible to reduce the probability that mobility 13 passes by the facility in the airport where the mobility user wishes to stop by or the facility in the airport recommended for the mobility user by the automatic operation, contrary to the intention of the mobility user.

After the movement control of processing S202, or in parallel with the movement control, mobility 13 may notify management server 11 of the fact that mobility 13 has entered the divided area corresponding to the information on the facilities in the airport displayed on display unit 133, through communicator 134 (S203).

This notification may include at least one of the information exemplified below.

Divided area ID where mobility 13 has entered

Current position of mobility 13

An ID of the facility in the airport that displays information (for example, the advertisement information and/or privilege information) on display unit 133 among the facilities in the airport located in the divided area where mobility 13 has entered.

Since the above information is the information used by management server 11 to specify (or identify) the area that the mobility user has entered or visited, the information may be collectively referred to as "entry area specifying information" or "visit area specifying information", for convenience.

By receiving the notification of "entry area specifying information" from mobility 13, management server 11 can specify (or identify) a restaurant, a cafe, or a store such as a souvenir shop where the advertisement information is presented to the mobility user.

Therefore, management server 11 can cause billing processing unit 1197 to determine whether the mobility user visited the store or perform the appropriate billing processing according to the number of visits for the advertiser of the advertisement information related to the specified store, for example.

(Server Operation Option 1: Billing Related Processing)

An example of Option 1 (billing related processing) related to an operation example of management server 11 will be described with reference to the flowchart in FIG. 17.

Figure 17:
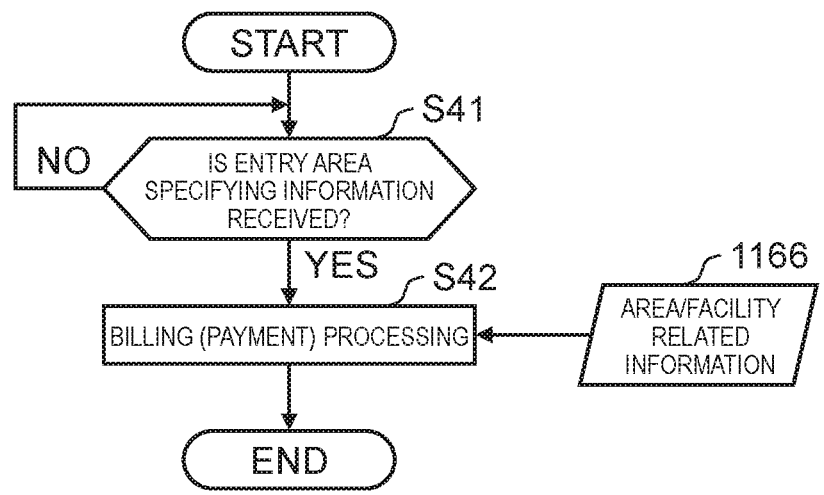
FIG. 17 is a flowchart illustrating an example of an option 1 (billing related processing) related to an operation example of the management server according to the exemplary embodiment.

As illustrated in FIG. 17, management server 11 monitors, for example, in billing processing unit 1197 of controller 119, whether the entry area specifying information is received from mobility unit 13 through communicator 114 (S41).

While the entry area specifying information is not received from mobility 13 (S41: NO), billing processing unit 1197 continues the reception monitoring of the entry area specifying information.

When the entry area specifying information is received from mobility 13 (S41: YES), billing processing unit 1197 performs the billing processing based on the received entry area specifying information and area/facility related information 1166, for example (S42).

For example, billing processing unit 1197 specifies the billing destination information related to the "advertisement" or the "privilege" by referring to area/facility related information 1166 illustrated in FIG. 9 based on the received entry area specifying information. Billing processing unit 1197 performs the billing processing, for example, by using the payment method indicated by the specified billing destination information.

Billing processing unit 1197 may record the history of the movement route for each mobility 13 in storage unit 116 as a movement log based on the received entry area specifying information and map information 1165, for example.

Billing processing unit 1197 may collectively perform the billing processing for a specific billing destination based on the movement log, for example, in a united period such as a half month, a monthly base, a half year, or an annual base. Further, the movement log may be subjected to, for example, statistical processing and used in a strategy related to a future "advertisement" and "privilege".

(Mobility Operation Option 3: Speed Setting Processing Used for Time Correction)

Next, an example of Option 3 (speed setting processing used for time correction) related to an operation example of mobility 13 will be described with reference to the flowchart in FIG. 18. The flowchart in FIG. 18 may be executed, for example, in time correction processing S17 in FIG. 12.

Figure 18:
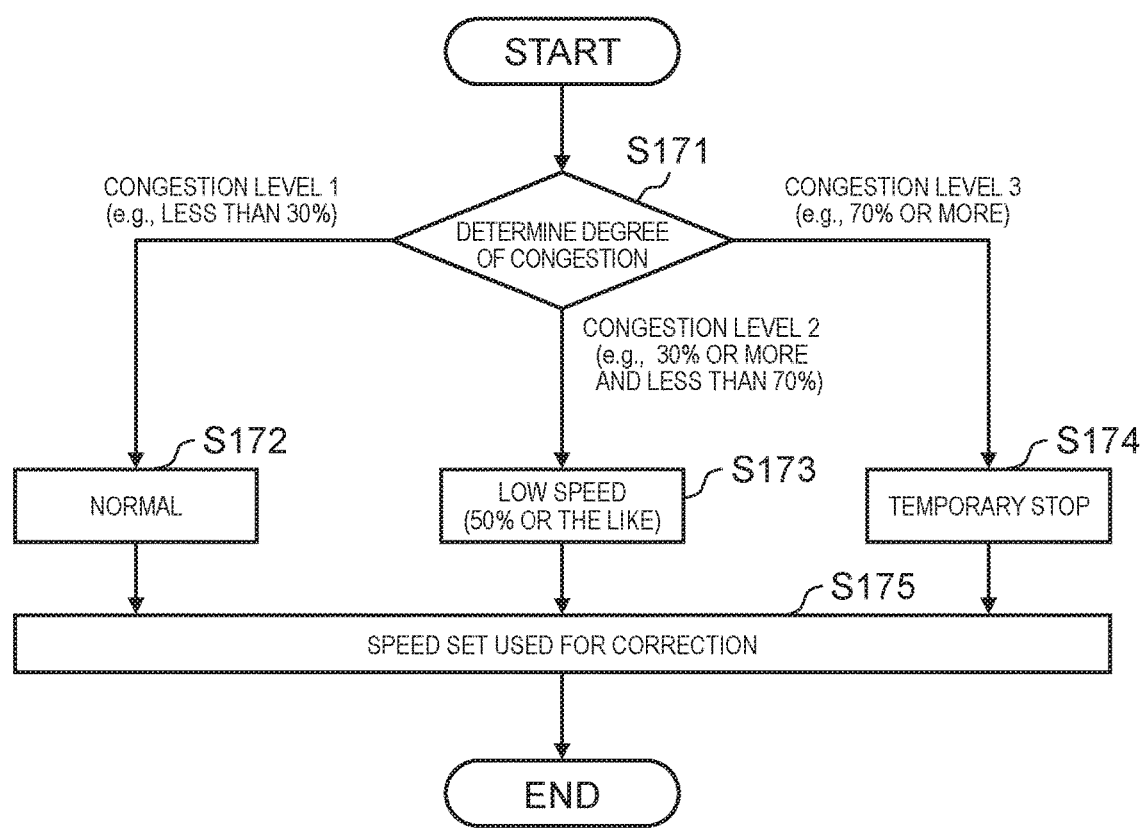
FIG. 18 is a flowchart illustrating an example of an option 3 (speed setting processing used for a time correction) related to an operation example of the mobility according to the exemplary embodiment.

As illustrated in FIG. 18, mobility 13 may change the settings related to the movement speed of mobility 13, which is used for a calculation of the required movement time according to the congestion level of the congestion expected area in required time estimation unit 1393, for example.

For example, required time estimation unit 1393 determines whether the congestion level of the congestion expected area is "1", "2", or "3" (S171). For example, for the determination of the congestion level, the estimated result of congestion status estimation unit 1192 received from management server 11 may be used as described in the determination processing S16 in FIG. 12.

When the congestion level is "1" as a result of the determination, required time estimation unit 1393 sets the movement speed of mobility 13 used for the calculation of the required movement time to the normal speed (for example, substantially 4 km per hour) (S172 and S175).

On the other hand, when the congestion level is "2", required time estimation unit 1393 sets the movement speed of mobility 13 used for the calculation of the required movement time to a speed lower than the normal speed (for example, 50% of the normal speed (2 km per hour) or the like) (S173 and S175).

Further, when the congestion level is "3", required time estimation unit 1393 determines that the movement of mobility 13 is impossible or difficult, and sets the movement speed of mobility 13 to, for example, 0 km per hour, which is a temporary stop state (S174 and S175).

(Mobility Operation Option 4: Alert Processing)

Next, an example of option 4 (alert processing) related to an operation example of mobility 13 will be described with reference to the flowchart in FIG. 19. The flowchart in FIG. 19 may be executed, for example, in alert processing S196 in FIG. 15.

Figure 19:
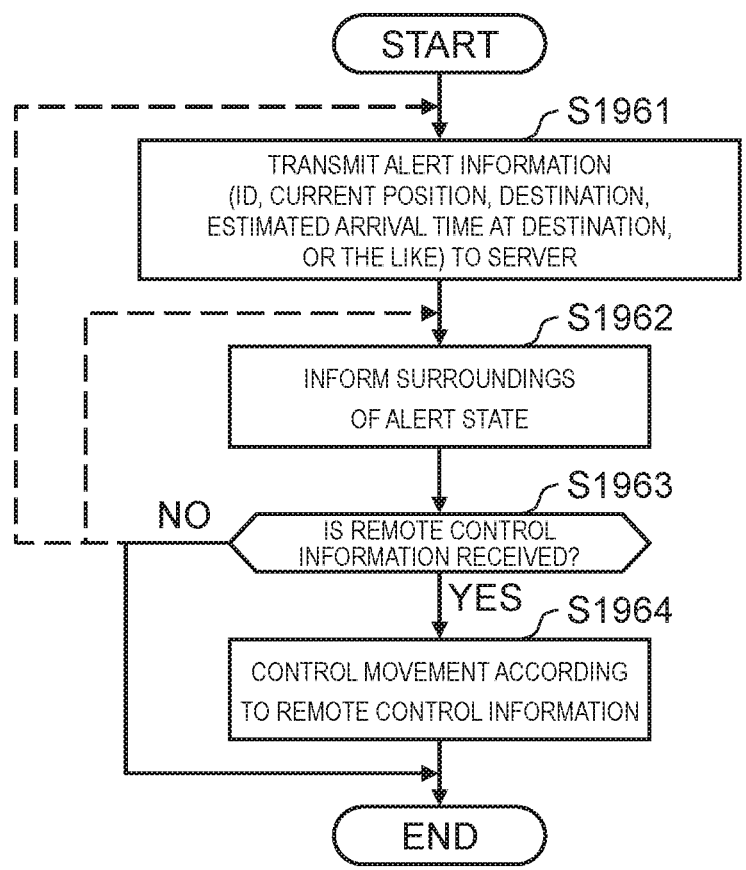
FIG. 19 is a flowchart illustrating an example of an option 4 (alert processing) related to an operation example of the mobility according to the exemplary embodiment.

As illustrated in FIG. 19, mobility 13 generates the alert information by, for example, alert processing unit 1398 of controller 139, and transmits (or notifies) the generated alert information to management server 11 through communicator 134 (S1961).

The alert information may include, for example, an ID of mobility 13, a current position, a destination, and information indicating the estimated arrival time at the destination. One or both of the destination of mobility 13 and the estimated arrival time at the destination may be optional.

Further, alert processing unit 1398 may output (for example, inform) a signal that notifies the surroundings of mobility 13 that it is the alert state by using, for example, an informer mounted on mobility 13 (S1962).

Informing processing S1962 of the alert state may be performed before transmission processing S1961 of the alert information to management server 11 or may be performed in parallel with transmission processing S1961. Informing processing S1962 of the alert state may be optional. Alternatively, between transmission processing S1961 and informing processing S1962, transmission processing S1961 may be optional.

Thereafter, alert processing unit 1398 may monitor, for example, whether the remote control information is received from management server 11 (S1963).

When the remote control information is not received (S1963: NO), alert processing unit 1398 may end the processing as indicated by the arrow with solid line, or alternatively, may return the processing to transmission processing S1961 or informing processing S1962 as indicated by the arrow with dotted line.

On the other hand, when the remote control information is received (S1963: YES), alert processing unit 1398 outputs the received remote control information to, for example, driving controller 1397. Driving controller 1397 controls the driving mechanism of mobility 13 according to the remote control information (S1964). As described above, mobility 13 that is in the alert state is controlled to move to the destination by the remote control from management server 11.

(Server Operation Option 2: Alert Processing)

Figure 20:
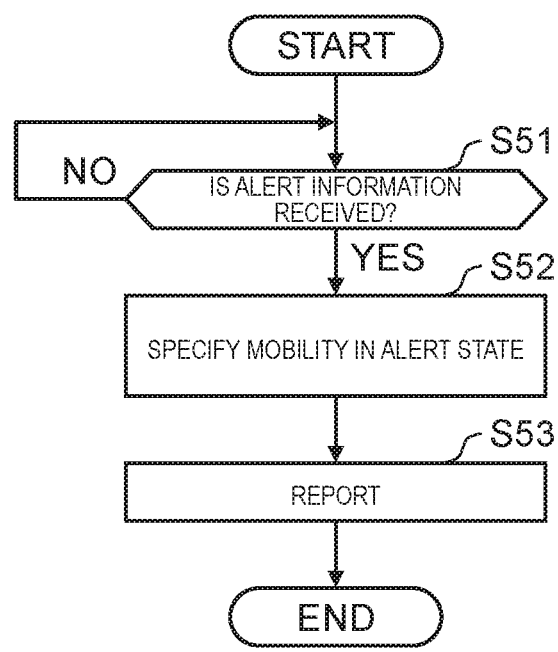
FIG. 20 is a flowchart illustrating an example of an option 2 (alert processing) related to an operation example of the management server according to the exemplary embodiment.

As an example of option 2 (alert processing) related to an operation example of management server 11, an example of the operation of management server 11 corresponding to the alert processing of mobility 13 is illustrated in the flowchart in FIG. 20.

As illustrated in FIG. 20, management server 11 may monitor, for example, whether the alert information is received from mobility 13 in alert processing unit 1193 (S51). While the alert information is not received (S51: NO), alert processing unit 1193 may continue to receive and monitor the alert information.

On the other hand, when the alert information is received (S51: YES), alert processing unit 1193 specifies the mobility 13 in the alert state and the current position thereof based on the received alert information (S52).

Alert processing unit 1193 may report the specified information to the support personnel such as an airport staff (S53). The support personnel who have received the report can promptly provide support such as preferentially guiding mobility 13 that is in the alert state to the destination, for example.

The report from management server 11 to the support personnel may be made to, for example, the wireless device possessed by the support personnel. Further, the reporting destination may be support personnel positioned at a location near the current position of mobility 13 that is in the alert state, or may be support personnel positioned at a location near the destination of mobility 13 when the destination of mobility 13 can be specified from the alert information. For example, when the destination of mobility 13 is a boarding gate, an airport staff who is positioned at the boarding gate may be set as the reporting destination.

In this case, the airport staff can promptly recognize the existence of a mobility user who is likely to arrive at the boarding gate lately, and take the priority of guiding mobility 13 to the destination boarding gate.

In processing S53, as an alternative to or in addition to the above reporting processing, management server 11 may remotely control the movement of mobility 13 that is in the alert state by remote controller 1194, for example.

For example, remote controller 1194 may transmit the remote control information for moving mobility 13 to the destination by the remote control to mobility 13 through communicator 114 (S53). By the remote control, the burden on the support personnel of mobility 13 can be reduced.

(Plurality of Route Candidates)

In the above-described exemplary embodiment, an example has been described in which route search unit 1391 searches for one shortest route from the current position of mobility 13 to the destination.

On the departure gate floor of the passenger terminal, unlike the route search for outdoor roads, the degree of freedom in selecting the route from the current location to the destination such as the boarding gate is low (in some cases, only one route can be selected), so that it can be said that it is often sufficient to search for the shortest route.

However, when there are a plurality of options for the movement route from the current location to the destination such as the boarding gate, route search unit 1391 may search for a plurality of route candidates. When a plurality of route candidates are searched, for example, each of processing S14 to S19 in FIG. 12 may be executed for each of the plurality of route candidates.

Among the plurality of route candidates, one or more route candidates that match the condition (or the rule, the policy, or the priority) may be selected by required time estimation unit 1393. For example, a route having a short required movement time, a route having an early estimated arrival time at the destination, or a route having a low degree of fatigue of the mobility user may be preferentially selected.

The information (or index) indicating the "degree of fatigue" may be calculated (or estimated) in required time estimation unit 1393 based on the information indicating the degree of congestion of the congestion expected area. For example, the information indicating the "degree of fatigue" may be calculated by quantifying and adding points the required movement time, the estimated arrival time at the destination, and/or the congestion level of the congestion expected area on the assumption that mobility 13 moves along a route passing through the congestion expected area.

In a case where the condition is designated or set, when it is a route candidate that matches the condition, a route candidate having a longer route length than other route candidates may be selected by required time estimation unit 1393 of mobility 13, for example.

The condition may be input (or designated) by the mobility user through input unit 132, or may be stored in storage unit 136 in advance as setting information. The setting information may be, for example, information statically set in mobility 13 (for example, storage unit 136), or may be information dynamically set from management server 11 by the communication between mobility 13 and management server 11.

A non-limiting example of the condition is a condition related to the facilities in the airport (for example, lounges, restaurants, cafes, or souvenir shops) that the mobility user wishes to stop by when there is a margin by the estimated arrival time with respect to the time at which the mobility user should arrive at the destination.

Another non-limiting example of the condition is a condition related to a route recommend for the mobility user (in other words, it is recommended to pass through with priority) when there is a margin by the estimated arrival time with respect to the time at which the mobility user should arrive at the destination.

For example, when there is a facility in the airport (for example, a lounge, a restaurant, a cafe, or a souvenir shop) recommended for the mobility user, a condition for preferentially selecting a route candidate that passes through such a facility in the airport as a movement route of mobility 13 may be set.

Such condition setting may be associated with the advertisement information and/or the privilege information related to the facilities in the airport recommended for the mobility user. For example, when displaying the movement route that matches the condition on display unit 133 of mobility 13, the advertisement information and/or the privilege information of the facilities in the airport on the movement route may be displayed together.

When the entry of mobility 13 into the area of the airport facility corresponding to the advertisement information and/or the privilege information is confirmed based on the current position of mobility 13 in management server 11, for example, the billing processing may be executed for the provider of the advertisement information and/or the privilege information.

The selection of the route from the plurality of route candidates may be performed by an instruction from the mobility user. For example, by causing display controller 1396 to display a plurality of route candidates on display unit 133 and receive a selection operation of the mobility user for any one or more route candidates, one or more routes may be selected from the plurality of route candidates.

When the plurality of route candidates are displayed on display unit 133, display controller 1396 may control the display order of each route candidate based on, for example, the information or index such as the required movement time, the estimated arrival time at the destination, and/or the degree of fatigue of the mobility user.

For example, a display order may be set higher as the route candidate has a shorter required movement time. Further, a display order may be set higher for route candidates whose estimated arrival time at the destination is earlier. Further, a display order may be set higher as the route candidate has a lower "degree of fatigue".

The search for a plurality of route candidates may be performed in management server 11, for example. When a plurality of route candidates are searched for in management server 11, one or more routes recommended to the mobility user may be selected based on the above-described conditions or indexes, and the information on the selected route may be provided to mobility 13 by communication.

When a plurality of recommended routes are provided to mobility 13, the plurality of recommended routes may be displayed on display unit 133 of mobility 13. Regarding the display of the plurality of recommended routes, the display order may be controlled by display controller 1396 as described above.

The mobility user may determine a preferred recommended route as the movement route by mobility 13 by performing a selection operation on a display screen of the plurality of recommended routes, for example.

The route candidates may be re-searched by, for example, periodic or aperiodic event occurrence (event trigger). For example, the route candidates may be re-searched according to the arrival of a period set in minutes such as several minutes and/or the change in flight information 1161.

The shorter the re-search period is set, the quicker the recalculation is possible according to changes in the congestion expected area and the time period thereof, while the recalculation load increases, thereby the two have a trade-off relationship. The re-search period may be optimized in consideration of such trade-off.

An example in which flight information 1161 is changed is as described above. The period for re-searching for route candidates and the estimated period for the congestion expected area and the time period thereof may be set to the same period or may be set to different periods from each other.

As described above, the number of route candidates in the airport facility is limited compared to outdoors, it can be said that the frequency of re-searching for the route candidates does not have to be so high. Therefore, as an example, the re-search period of the route candidates may be set to a period shorter than the estimated period of the congestion expected area and the time period thereof.

<Combination of Options>

A part or all of options 1 to 4 related to the operation example of mobility 13 described above may be appropriately combined with the exemplary embodiment as long as there is no contradiction. One or both of options 1 and 2 related to the operation example of management server 11 may be appropriately combined with the exemplary embodiment as long as there is no contradiction.

<Example of Display Screen>

Next, with reference to FIGS. 21 and 22, a non-limiting example of the display form on display unit 133 of mobility 13 will be described. The example of the display forms illustrated in FIGS. 21 and 22 may be regarded as an example of the display form on the display unit of the UE.

The display form of display unit 133 is controlled by display controller 1396, for example. Further, the display form of display unit 133 may be controlled according to the operation state of mobility 13, for example. For example, display controller 1396 may control the display form of display unit 133 in association with the control of driving unit 137 by driving controller 1397.

The control of the display form may include, for example, scroll a display screen, scale change, popup display, and/or display control such as enlargement, reduction, color change, or blinking of information (characters and/or diagrams or the like) displayed on a display screen.

Figure 21:
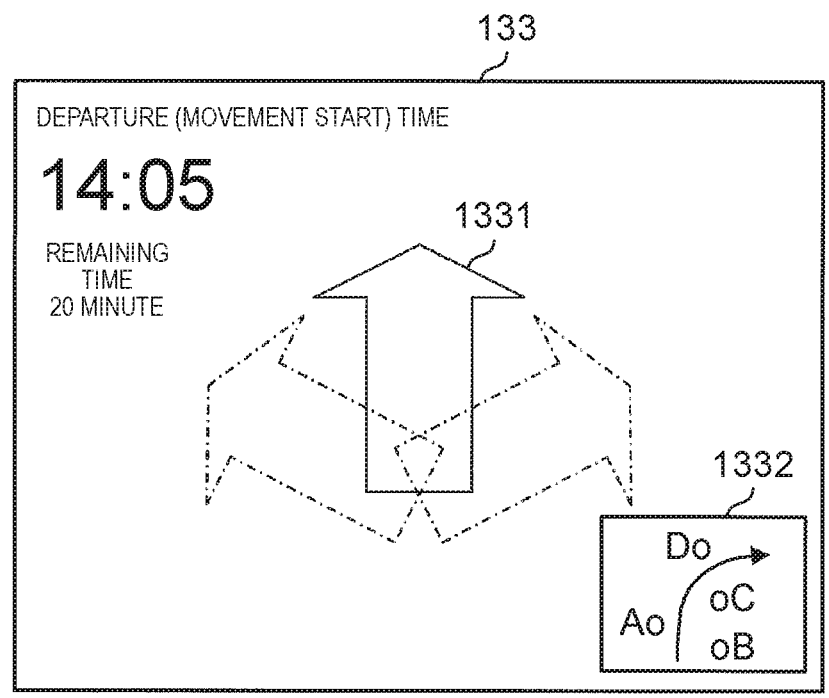
FIG. 21 is a diagram illustrating an example of a display form on a display unit of the mobility according to the exemplary embodiment.

As illustrated in FIG. 21, display unit 133 may display the arrow (hereinafter, it may be abbreviated as a "guide arrow") 1331 that guides mobility 13 in movement direction when mobility 13 moves on the route searched by route search unit 1391.

The display form of guide arrow 1331 may change according to the operation state of mobility 13, for example. For example, as indicated by a one-dot chain line in FIG. 21, the direction indicated by guide arrow 1331 may change as mobility 13 moves along the searched route.

Further, for example, the size and/or the color of guide arrow 1331 may change according to the movement speed of mobility 13. For example, the higher the movement speed of mobility 13, the larger guide arrow 1331 may be displayed, and the color of guide arrow 1331 may be displayed so as to change from a cold color to a warm color.

Display unit 133 may display the time, which is estimated by required time estimation unit 1393, together with (or in association with) the display of guide arrow 1331.

For example, the time (departure time or movement start time) at which mobility 13 should depart from the current position in order to arrive at the destination (for example, a boarding gate) at a predetermined time, is illustrated in FIG. 21. The "movement start time" may be, for example, time T1 after the "advance correction" described with reference to FIG. 13.

When there is a time from the current time to the "movement start time", instead of or in addition to the "movement start time", the remaining time (it may be referred to as "standby time" or "grace time") from the current time to the "movement start time" may be displayed on display unit 133.

For example, a message such as "Please start moving within XX minutes from now" may be displayed on display unit 133. Alternatively or additionally, the message may be output from output device 1003 (for example, a speaker), for example.

The "remaining time" may be displayed as a countdown as time passes. When the "remaining time" is exhausted, for example, an alarm display for informing of the arrival of the "movement start time" may be performed on display unit 133. Alternatively or additionally, an alarm sound informing of the arrival of the movement start time may be output from output device 1003 (for example, a speaker).

Figure 22:
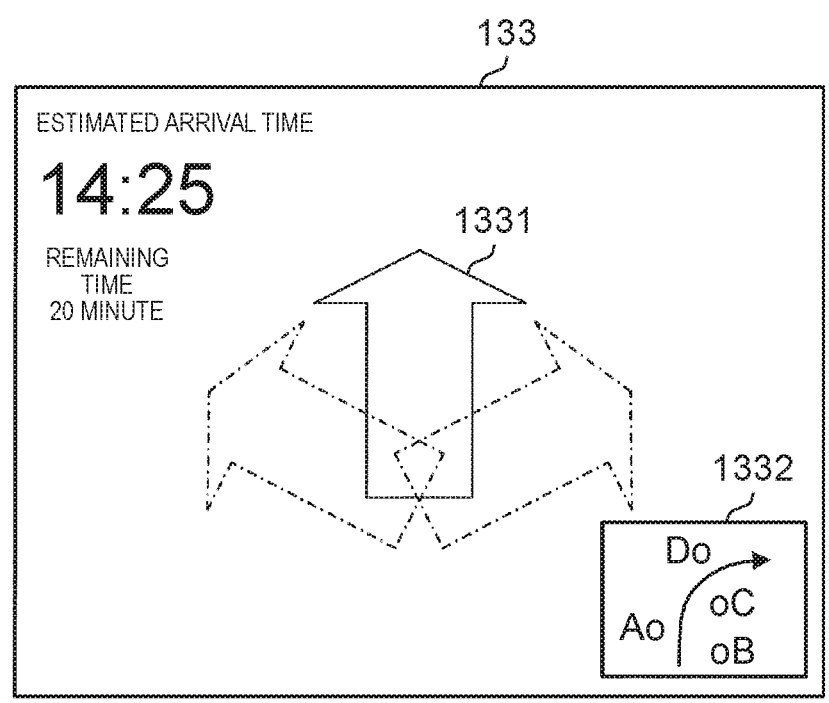
FIG. 22 is a diagram illustrating another example of a display form on the display unit of the mobility according to the exemplary embodiment.

Further, for example, as illustrated in FIG. 22, display unit 133 may display the "estimated arrival time" together with the display of guide arrow 1331. The "estimated arrival time" represents the estimated time at which mobility 13 can arrive at the destination when mobility 13 immediately departs from the current position at the current time.

The "estimated arrival time" is obtained, for example, by adding the required movement time, which is obtained by avoiding movement in the congestion expected area and the time period thereof, to the current time in required time estimation unit 1393.

When there is time from the "estimated arrival time" to the predetermined time at which mobility 13 should arrive at the destination, for example, the time it may be referred to as "margin time" for convenience) may be displayed on display unit 133 together with (or in association with) the display of the "estimated arrival time".

Further, instead of or in addition to the various display examples related to the time described above, the information indicating the time period and/or the degree of congestion of the congestion expected area, which is estimated in management server 11, may be displayed on display unit 133. The information indicating the degree of congestion may be displayed according to the congestion level described above. Further, the above-mentioned "degree of fatigue" may be displayed on display unit 133.

The information indicating the time period, the degree of congestion, and/or the degree of fatigue of the congestion expected area may be displayed, for example, in association with a location corresponding to the congestion expected area in the map information (it may be referred to as a "map display screen") displayed on display unit 133.

In the display forms illustrated in FIGS. 21 and 22, guide arrow 1331 may be displayed, for example, overlapping the map display screen of display unit 133. In other words, guide arrow 1331 may be displayed on display unit 133 in association with the map information of the airport facility. For example, on the map display screen, guide arrow 1331 may be displayed in a position corresponding to the current position of mobility 13 in an overlapping manner.

Further, in association with the movement of mobility 13, the map display screen may be scrolled according to the movement direction and movement speed of mobility 13 and the display form such as the direction, size, and/or color of guide arrow 1331 may change according to the movement direction and movement speed.

As illustrated in FIGS. 21 and 22, on display unit 133, the information related to one or more facilities in the airport (for example, restaurants, cafes, and/or souvenir shops) where mobility 13 can stop by around the searched route may be displayed in display area 1332.

Display area 1332 may be at least a part of the entire display area of display unit 133. As illustrated in FIG. 21 and FIG. 22, in display area 1332, the information related to the facilities in the airport may be displayed together with (or in association with) the information indicating the searched route. Further, in display area 1332, for example, the advertisement information and/or the privilege information may be displayed in association with the information related to the facilities in the airport.

The information displayed in display area 1332 may be, for example, information on the facilities in the airport for which the mobility user has designated conditions, or information on the facilities in the airport recommended by the airport facility side to the mobility user.

The mobility user can easily stop by at any of the facilities in the airport by checking area/facility related information 1166 when there is margin time to reach the destination from the current position.

Further, the information related to the facilities in the airport may be displayed in association with the location corresponding to the position of the facilities in the airport together with the display of the searched route on the map display screen of display unit 133, for example.

According to such a display form, the visibility of the relationship between the current position of mobility 13 and the position of the facilities in the airport where the mobility user can stop by on the searched route, is improved. Therefore, it contributes to promotion of use of facilities in the airport by the mobility user.

Display area 1332 may be displayed in a pop-up manner on display unit 133, for example, when display controller 1396 detects a selection operation (for example, a tap) of the mobility user with respect to a specific screen area of display unit 133.

For example, by tapping an area corresponding to a facility in the airport on the map display screen described above, detailed information corresponding to the facility in the airport may be displayed in a pop-up manner. By the display in a pop-up manner, for example, the visibility of the information related to the facilities in the airport can be further improved.

When information related to a plurality of facilities in the airport is a display candidate, for example, the display order may be controlled based on the information such as the presence or absence of a privilege and the content of the privilege when the facility in the airport is used, and the age and/or the gender of the mobility user.

For example, a facility in the airport for which a privilege such as a coupon ticket or a discount ticket is prepared may be set to have a higher display order than a facility in the airport for which no privilege is prepared. Further, for example, a facility in the airport where the content of the privilege matches the age and/or the gender of the mobility user may be set higher in display order than the other facilities in the airport.

The personal information such as the age and/or gender of the mobility user may be manually input through input unit 132 by the mobility user, for example. Alternatively, for example, similar to the information input of the destination, the personal information may be input to mobility 13 by the communication between the UE and mobility 13 through communicator 134. Further, for example, based on the passport information presented by the mobility user in the immigration control, the personal information of the mobility user may be input to mobility 13 by the communication between management server 11 and mobility 13 through communicator 134.

Example of Effects Obtained in Exemplary Embodiment

As described above, according to the above-described exemplary embodiment, based on the flight information and the information related to the boarding gate associated with the flight, congestion and time that may occur in the future around the boarding gate are estimated, and the estimated result is presented to, for example, the mobility user.

Thereby, the mobility user can act inside the airport facility while avoiding an area and a time period where congestion is expected around the boarding gate, for example, during the waiting time until the flight time scheduled to be boarded. Therefore, for example, it is possible to expand the selecting options of actions that the mobility user can take during the waiting time before the departure time of the flight.

Since the estimated results of the congestion that may occur in association with the scheduled future flights and the time thereof are presented to the mobility user, it is possible to reduce the possibility of being involved in congestion while moving the route to the target boarding gate after the mobility user starts moving to the boarding gate.

Further, for example, based on the above estimated result, information related to the time the mobility user can reach the boarding gate while avoiding the congestion expected area and time period, and the time at which the mobility user should depart the current position, is calculated and presented to the mobility user. Therefore, it contributes to the smooth movement of the mobility user to the boarding gate.

For example, since the departure time from the current position where the "advance correction" or the "after correction" is performed, is presented to the mobility user, even when a detour or alternative route cannot be selected, it is possible to increase the probability that the mobility user can smoothly reach the target boarding gate without getting involved in congestion.

Since the mobility user can smoothly move to the boarding gate, for example, the burden of support work of airport staff for the mobility user can be reduced.

Further, for example, when there is a margin in waiting time by the flight by correcting the departure time from the current position, the information related to the facilities in the airport where the mobility user can stop by avoiding the congestion while moving on the route, is presented to the mobility user. For example, the mobility user can stop by at the presented facility in the airport to kill time (in other words, use time effectively) while moving on the route to the boarding gate.

By presenting the information based on the estimated result of the congestion and the time period using the flight information, it is possible to expand the selecting options of actions of the mobility user at the airport facility.

In other words, display unit 133 of mobility 13 displays the information related to the movement plan when the mobility 13 is used to move to the boarding gate based on the flight information. The information related to the movement plan may be regarded as suggestion information related to the action that the mobility user can take when moving to the destination.

The information related to the movement plan may include information related to time and geographical information, for example. One of these pieces of information may be associated with the other. The geographical information may include any one or more of the information indicating the current location, the information indicating the destination, the information related to the route from the current location to the destination, and the information related to facilities (and/or locations) located around the route.

By presenting the information related to the movement plan to the mobility 13, it is possible to expand the selecting options of actions of the mobility user. Therefore, for example, it is possible to provide the mobility user with a sense of enjoyment of using the airport (for example, movement in the airport facility using the mobility 13) and/or a sense of security by effectively using the waiting time, or the like.

Therefore, it is possible to increase the added value of using mobility 13 in the airport facility. Further, the added value of using mobility 13 contributes to improving the image of the airport.

<Others>

The UE possessed by the airport user who moves in the airport facility on foot may correspond to the "moving body". For example, the movement speed on foot may be treated as the movement speed of the UE, and the "mobility navi" according to the above-described exemplary embodiment may be provided to the UE.

Further, the "mobility navi" according to the above-described exemplary embodiment may be provided in a facility or venue where one or more future events are scheduled, such as a theme park, exhibition hall, museum, movie theater, or concert venue.

Each functional block used in the description of the above exemplary embodiment is typically realized as a large scale integration (LSI) which is an integrated circuit. These may be individually made into one chip, or may be made into one chip so as to include a part or all of the functional blocks. The name used here is LSI, but it may also be called an integrated circuit (IC), system LSI, super LSI, or ultra LSI depending on the degree of integration.

Further, the method of the circuit integration is not limited to LSI, and it may be realized by a dedicated circuit or a general-purpose processor. After manufacturing the LSI, a field programmable gate array (FPGA) capable of programming or a reconfigurable processor capable of reconfiguring the connection or settings of circuit cells inside the LSI may be used.

Furthermore, if integrated circuit technology comes out to replace LSI as a result of the advancement of semiconductor technology or a derivative other technology, the technology may be used to integrate the functional blocks. The application of biotechnology or the like is possible.

A comprehensive or specific aspect of the present exemplary embodiment may be realized by a system, a method, an integrated circuit, a computer program, or a recording medium, or may be realized by any combination of a system, an apparatus, a method, an integrated circuit, a computer program, and a recording medium.

According to one aspect of the present disclosure, the movement that uses the moving body can be guided by a movement plan that takes into account areas and time when congestion may occur due to scheduled events that occur in the future.

Further advantages and effects of one aspect of the present disclosure will be apparent from the specification and the drawings. Such advantages and/or effects are provided by the features described in several exemplary embodiments and in the specification and drawings, respectively, but not all are necessarily provided to obtain one or more of the same features.

INDUSTRIAL APPLICABILITY

The present disclosure is suitable for navigation of movement using a moving body such as an electric wheelchair, for example.

REFERENCE MARKS IN THE DRAWINGS

G101 to G117 BOARDING GATES
1 NAVIGATION SYSTEM
11 MANAGEMENT SERVER
13 MOBILITY
15 ACCESS POINT (AP)
17 NETWORK
19 PAYMENT SERVER
112 INPUT UNIT
113 DISPLAY UNIT
114 COMMUNICATOR
116 STORAGE UNIT
119 CONTROLLER
131 OPERATION UNIT
132 INPUT UNIT
133 DISPLAY UNIT (DISPLAY)
134 COMMUNICATOR
135 SENSOR
136 STORAGE UNIT
137 DRIVING UNIT
138 BATTERY
139 CONTROLLER
1001 PROCESSOR
1002 INPUT DEVICE
1003 OUTPUT DEVICE
1004 MEMORY
1005 STORAGE
1006 COMMUNICATION INTERFACE (COMMUNICATION IF)
1007 SENSOR
1008 DRIVING UNIT
1009 POWER SUPPLY CIRCUIT
1010 BUS
1161 FLIGHT INFORMATION
1162 FLIGHT RESERVATION INFORMATION
1163 MOBILITY ATTRIBUTE INFORMATION
1164 MOBILITY POSITION INFORMATION
1165 MAP INFORMATION
1166 AREA/FACILITY RELATED INFORMATION
1191 MOBILITY MANAGEMENT UNIT
1192 CONGESTION STATUS ESTIMATION UNIT
1193 ALERT PROCESSING UNIT
1194 REMOTE CONTROLLER
1195 COMMUNICATION CONTROLLER
1196 DISPLAY CONTROLLER

1197 BILLING PROCESSING UNIT (PAYMENT PROCESSING UNIT)
1331 GUIDE ARROW
1332 DISPLAY AREA
1391 ROUTE SEARCH UNIT
1392 CURRENT POSITION DETECTOR
1393 REQUIRED TIME ESTIMATION UNIT
1394 FACILITY RELATED INFORMATION MANAGEMENT UNIT
1395 COMMUNICATION CONTROLLER
1396 DISPLAY CONTROLLER
1397 DRIVING CONTROLLER
1398 ALERT PROCESSING UNIT
2001 PROCESSOR
2002 INPUT DEVICE
2003 OUTPUT DEVICE
2004 MEMORY
2005 STORAGE
2006 COMMUNICATION INTERFACE (IF)
2009 POWER SUPPLY CIRCUIT
2010 BUS

The invention claimed is:

1. A navigation method comprising:
estimating, based on schedule information indicating one or more scheduled events and information related to a location associated with each of the one or more scheduled events, an area and a time at both of which congestion increases around the location, as a congestion status;
presenting, to a moving body through a wireless communication, information which is based on a result of the estimating of the area and the time, and which is related to a movement plan when moving using the moving body;
navigating the moving body using the information based on the result of the estimating of the area and the time, and information related to the movement plan,
wherein the information related to the movement plan includes (1) movement start information indicating time at which the moving body starts movement from a current position toward a destination, and (2) information related to a facility that the moving body stops while moving to the destination,
determining whether the moving body has entered a divided area corresponding to the information related to the facility which is included in the information related to the movement plan; and
when determined that the moving body has entered the divided area, autonomously changing a speed of the moving body,
wherein the congestion status is periodically updated or updated by an event trigger associated with the schedule information, and
the movement plan is recalculated based on a latest congestion status.

2. The navigation method of claim 1, wherein
generation of the movement start information includes
detecting the current position of the moving body by at least one of a beacon signal transmitted from the moving body or a signal using GPS (Global Positioning System), and receiving an input of information indicating the destination,
searching for a route from the current position to the destination in map information including the location associated with each of the one or more scheduled events, and
calculating the movement start information based on the estimated time at which the congestion increases, when the searched route and the estimated area where the congestion increases overlap each other.

3. The navigation method of claim 2, wherein calculation of the movement start information includes
changing the time at which the moving body starts movement from the current position, and the time at which the moving body reaches the location by moving on the route by time when an event of the one or more scheduled events occurs in a case where the route and the area where the congestion increases do not overlap each other, to time which is shifted according to the estimated time at which the congestion increases.

4. The navigation method of claim 2, wherein calculation of the movement start information is performed based on at least one of information related to a speed of the moving body and information related to a size of the moving body.

5. The navigation method of claim 2, wherein the movement start information is recalculated according to a change in at least one of the schedule information and the location.

6. The navigation method of claim 5, wherein information related to a facility located around the route is displayed on a display of the moving body when a remaining time from a current time to the time at which the movement is started is greater than or equal to a predetermined time.

7. The navigation method of claim 2, wherein the information related to the movement plan includes information related to a facility located around the route.

8. The navigation method of claim 7, wherein the information related to the facility includes or is associated with information related to at least one of an advertisement and a privilege which are related to the facility.

9. The navigation method of claim 1, wherein the schedule information is flight information in which a flight that is the one or more scheduled events occurring at an airport is scheduled, and the location is a boarding gate associated with the flight.

10. The navigation method of claim 9, wherein estimation of the area and the time at both of which the congestion increases is performed based on at least one of a count indicating how many persons are reserved for the flight and a count indicating how many persons have completed check in for the flight.

11. The navigation method of claim 9, wherein the moving body is an electric vehicle used to move in the airport.

12. The navigation method of claim 1,
wherein the divided area is disposed on a way towards the destination and is different from the destination.

13. A navigation system comprising:
a moving body; and
a server that wirelessly communicates with the moving body, wherein:
the server is configured to
estimate, based on schedule information indicating one or more scheduled events and information related to a location associated with each of the one or more scheduled events, an area and a time at both of which congestion increases around the location, as a congestion status,
transmit, through a wireless communication, an estimated result to the moving body, the estimated result including information related to a movement plan, and the moving body includes
a receiver that receives the estimated result, and
a display that displays information which is based on the estimated result, and which is related to the movement plan, wherein the moving body is configured to move based on the schedule information, wherein the information related to the movement plan includes movement start information indicating time at which the moving body is to start movement from a current position toward a destination and information related to a facility that the moving body may stop by while moving to the destination, determine whether the moving body has entered a divided area corresponding to the information related to the facility which is included in the information related to the movement plan, and when determined that the moving body has entered the divided area, autonomously change a speed of the moving body, the congestion status is periodically updated or updated by an event trigger associated with the schedule information, and the movement plan is recalculated based on a latest congestion status.

14. The navigation system of claim 13, wherein the moving body:
includes a detecting circuit that detects the current position of the moving body;
is configured to receive an input of information indicating the destination of the moving body;
includes a memory that stores map information including the location associated with each of the one or more scheduled events;
is configured to search for a route from the current position of the moving body to the destination in the map information of the memory; and
is configured to calculate movement start information indicating time at which the moving body is to start movement on the route from the current position toward the destination based on the time at which the congestion increases in the estimated result when the route and the area where the congestion increases in the estimated result overlap each other, wherein
the information related to the movement plan includes the movement start information calculated by the moving body.

15. The navigation system of claim 13, further comprising a detecting circuit configured to detect the current position of the moving body by at least one of a beacon signal transmitted from the moving body or a signal using GPS,
wherein the congestion status is updated based on the current position of the moving body.

16. The navigation system of claim 15,
wherein the movement plan is recalculated based on the current position of the moving body.

17. The navigation system of claim 13,
wherein the one or more scheduled events includes a scheduled flight.

18. The navigation system of claim 13,
wherein the divided area is disposed on a way towards the destination and is different from the destination.

19. A moving body comprising:
a wireless receiver that receives a result of estimation of, based on schedule information indicating one or more scheduled events and information related to a location which is associated with each of the one or more scheduled events, an area and a time at both of which congestion increases around the location, as a congestion status; and
a display that displays information which is based on the result of estimation of the area and the time, and which is related to a movement plan, wherein the moving body is configured to move based on the result of estimation of the area and the time and the movement plan when moving using the moving body,
wherein the moving body is configured to move based on the schedule information,
wherein the information related to the movement plan includes movement start information indicating time at which the moving body is to start movement from a current position toward a destination and information related to a facility that the moving body stops by while moving to the destination, and
wherein the moving body is configured to autonomously change a speed thereof when it is determined that the moving body has entered a divided area corresponding to the information related to the facility which is included in the information related to the moving plan,
wherein the movement plan is periodically updated based on a latest congestion status that is periodically updated or updated by an event trigger associated with the schedule information.

20. The moving body of claim 19,
wherein the divided area is disposed on a way towards the destination and is different from the destination.

* * * * *